US011416165B2

(12) United States Patent
Mathuriya et al.

(10) Patent No.: US 11,416,165 B2
(45) Date of Patent: Aug. 16, 2022

(54) LOW SYNCH DEDICATED ACCELERATOR WITH IN-MEMORY COMPUTATION CAPABILITY

(71) Applicant: INTEL CORPORATION, Santa Clara, CA (US)

(72) Inventors: Amrita Mathuriya, Portland, OR (US); Sasikanth Manipatruni, Portland, OR (US); Victor Lee, Santa Clara, CA (US); Huseyin Sumbul, Portland, OR (US); Gregory Chen, Portland, CA (US); Raghavan Kumar, Hillsboro, OR (US); Phil Knag, Hillsboro, OR (US); Ram Krishnamurthy, Portland, OR (US); Ian Young, Portland, OR (US); Abhishek Sharma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 957 days.

(21) Appl. No.: 16/160,482

(22) Filed: Oct. 15, 2018

(65) Prior Publication Data

US 2019/0056885 A1    Feb. 21, 2019

(51) Int. Cl.
*G06F 12/00* (2006.01)
*G06F 3/06* (2006.01)
(Continued)

(52) U.S. Cl.
CPC ............ *G06F 3/0655* (2013.01); *G06F 3/061* (2013.01); *G06F 3/0683* (2013.01);
(Continued)

(58) Field of Classification Search
CPC ......... G06F 12/0804; G06F 2212/1021; G06F 2212/262; G06F 2212/608
See application file for complete search history.

(56) References Cited

U.S. PATENT DOCUMENTS 11,243,880 B1 * 2/2022 Ross ..................... G06F 3/0673
2015/0199126 A1 * 7/2015 Jayasena ............... G06F 3/0647
711/170

(Continued)

OTHER PUBLICATIONS

Eckert, et al. (2018). Neural Cache: Bit-Serial In-Cache Acceleration of Deep Neural Networks. 45th ACM/IEEE International Symposium on Computer Architecture (ISCA), May 9, 2018, 14 pages.

(Continued)

*Primary Examiner* — Shawn X Gu
*Assistant Examiner* — Mohammad S Hasan
(74) *Attorney, Agent, or Firm* — Trop, Pruner & Hu, P.C.

(57) ABSTRACT

The present disclosure is directed to systems and methods of implementing a neural network using in-memory, bit-serial, mathematical operations performed by a pipelined SRAM architecture (bit-serial PISA) circuitry disposed in on-chip processor memory circuitry. The on-chip processor memory circuitry may include processor last level cache (LLC) circuitry. The bit-serial PISA circuitry is coupled to PISA memory circuitry via a relatively high-bandwidth connection to beneficially facilitate the storage and retrieval of layer weights by the bit-serial PISA circuitry during execution. Direct memory access (DMA) circuitry transfers the neural network model and input data from system memory to the bit-serial PISA memory and also transfers output data from the PISA memory circuitry to system memory circuitry. Thus, the systems and methods described herein beneficially leverage the on-chip processor memory circuitry to perform a relatively large number of vector/tensor calculations without burdening the processor circuitry.

18 Claims, 18 Drawing Sheets

(51) Int. Cl.
   *G06F 12/1081*   (2016.01)
   *G06N 3/04*      (2006.01)
   *G06F 12/0802*   (2016.01)
   *G06N 3/063*     (2006.01)
   *G06F 12/0875*   (2016.01)
   *G06F 12/0897*   (2016.01)

(52) U.S. Cl.
   CPC ...... *G06F 12/0802* (2013.01); *G06F 12/0875* (2013.01); *G06F 12/0897* (2013.01); *G06F 12/1081* (2013.01); *G06N 3/04* (2013.01); *G06N 3/0445* (2013.01); *G06N 3/063* (2013.01); *G06F 2212/621* (2013.01)

(56) References Cited

U.S. PATENT DOCUMENTS

| | | | |
|---|---|---|---|
| 2018/0315473 A1* | 11/2018 | Yu | G06N 3/063 |
| 2018/0358110 A1* | 12/2018 | Buyuktosunoglu | G06N 3/04 |
| 2019/0005376 A1* | 1/2019 | Akin | G06N 3/08 |
| 2019/0057036 A1 | 2/2019 | Mathuriya et al. | |
| 2019/0057300 A1 | 2/2019 | Mathuriya et al. | |
| 2019/0057304 A1 | 2/2019 | Mathuriya et al. | |

OTHER PUBLICATIONS

Unpublished—U.S. Appl. No. 16/160,466, filed Oct. 15, 2018.
Unpublished—U.S. Appl. No. 16/160,270, filed Oct. 15, 2018.
Unpublished—U.S. Appl. No. 16/160,800, filed Oct. 15, 2018.

* cited by examiner

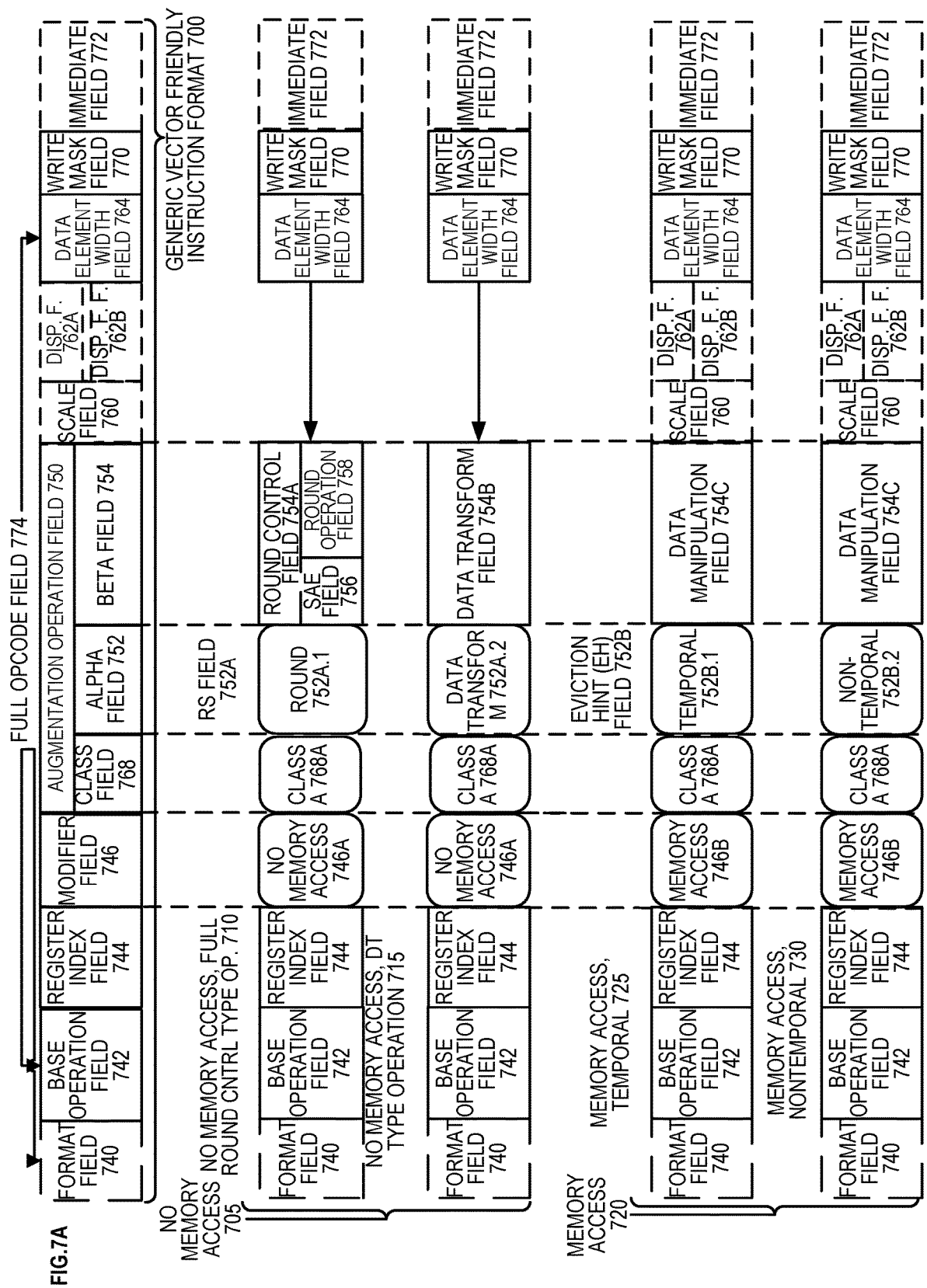

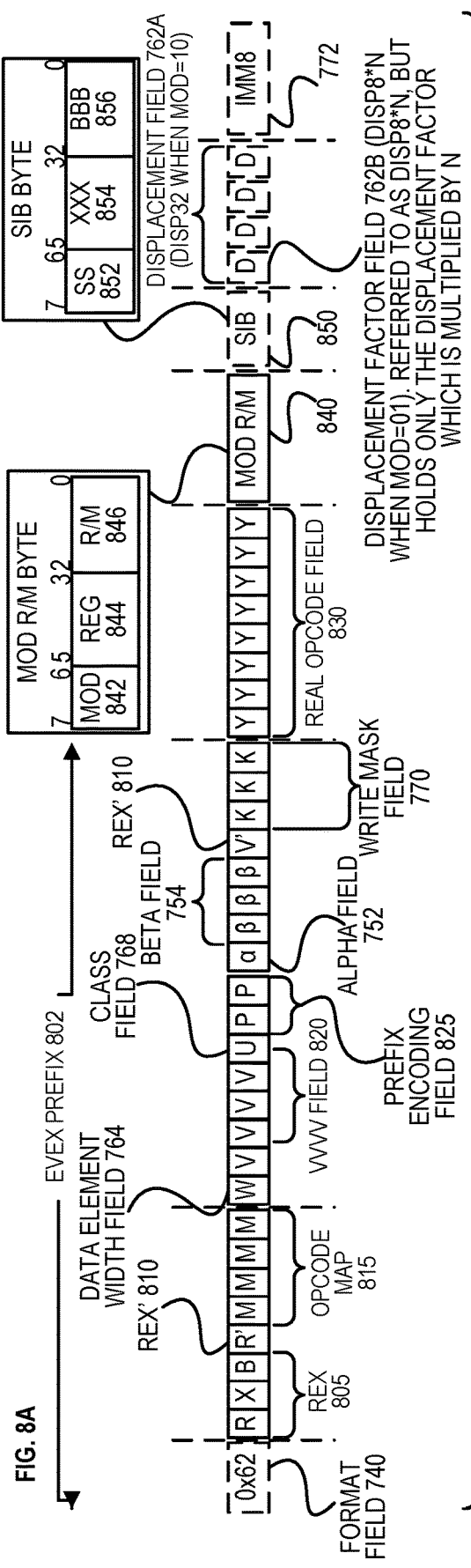
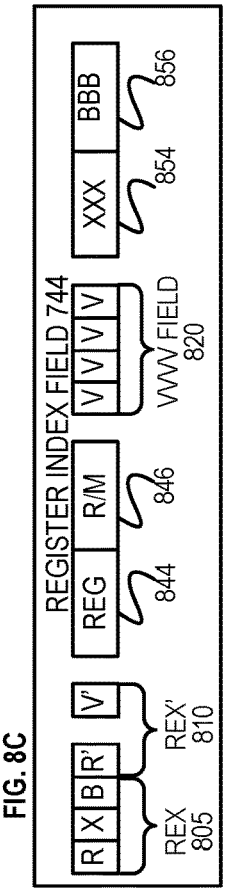
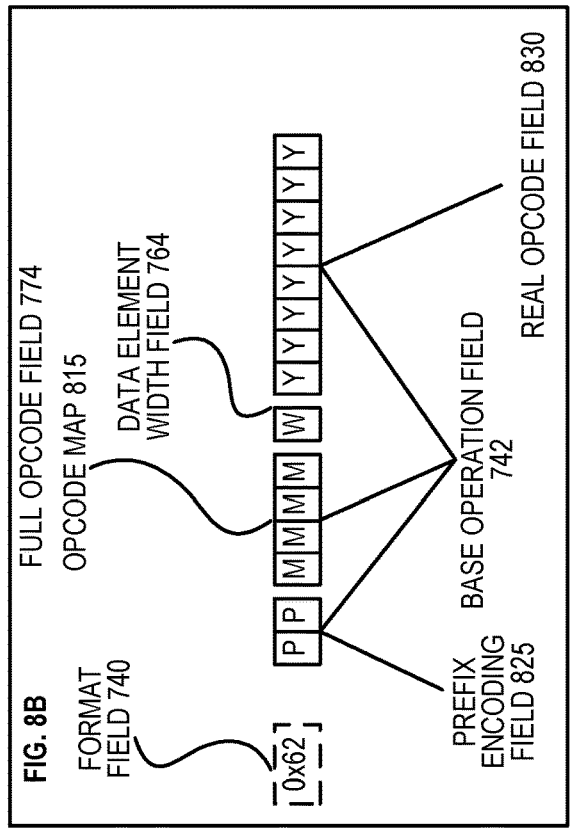

FIG. 9
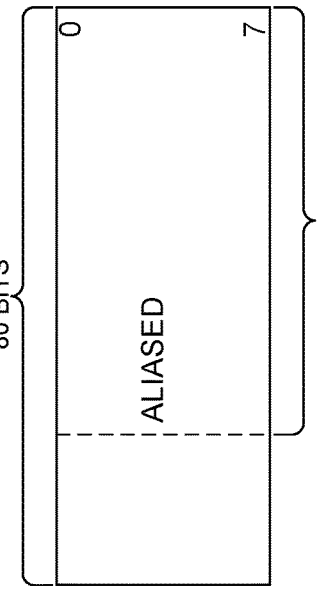
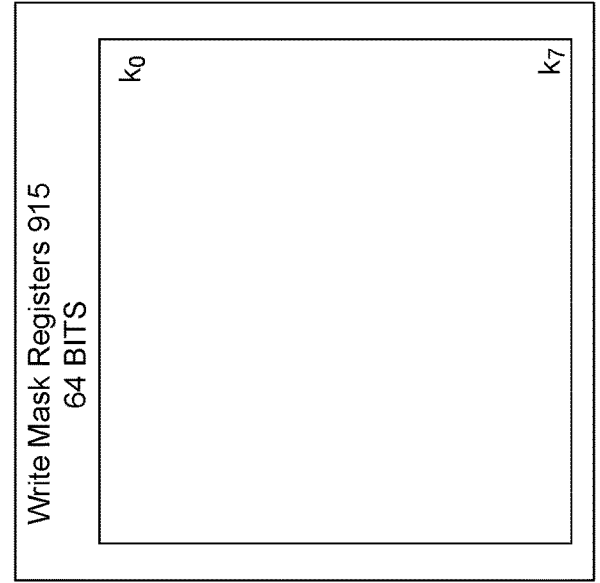
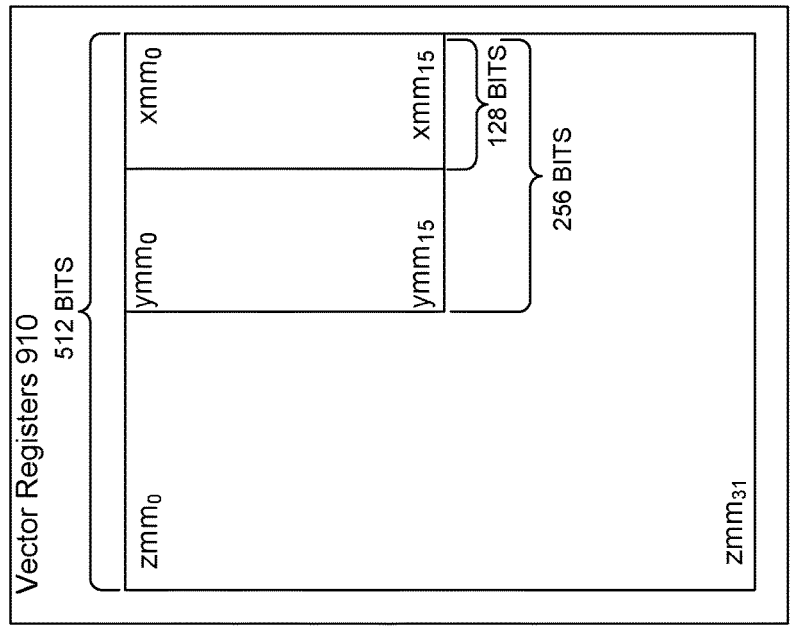

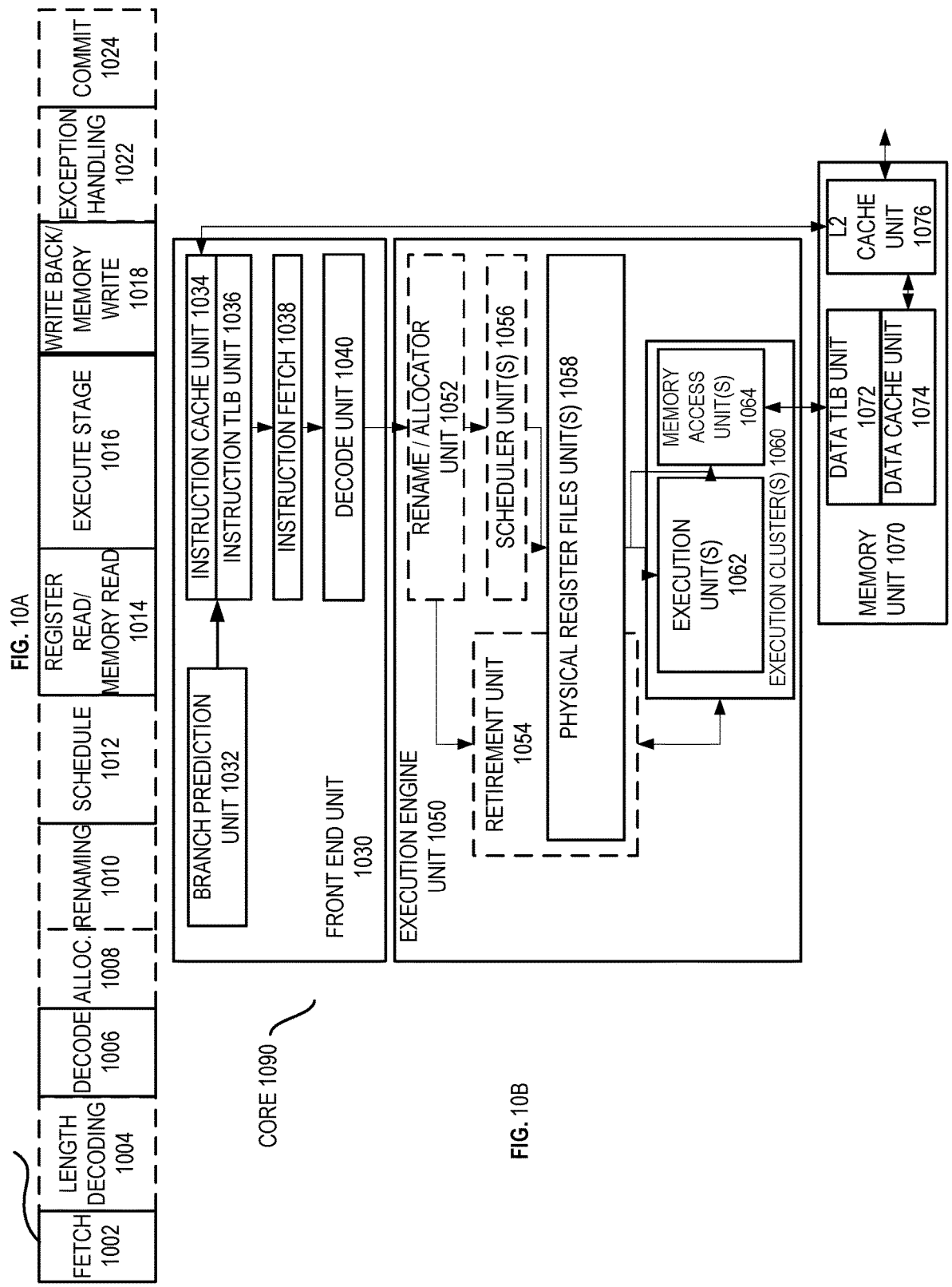

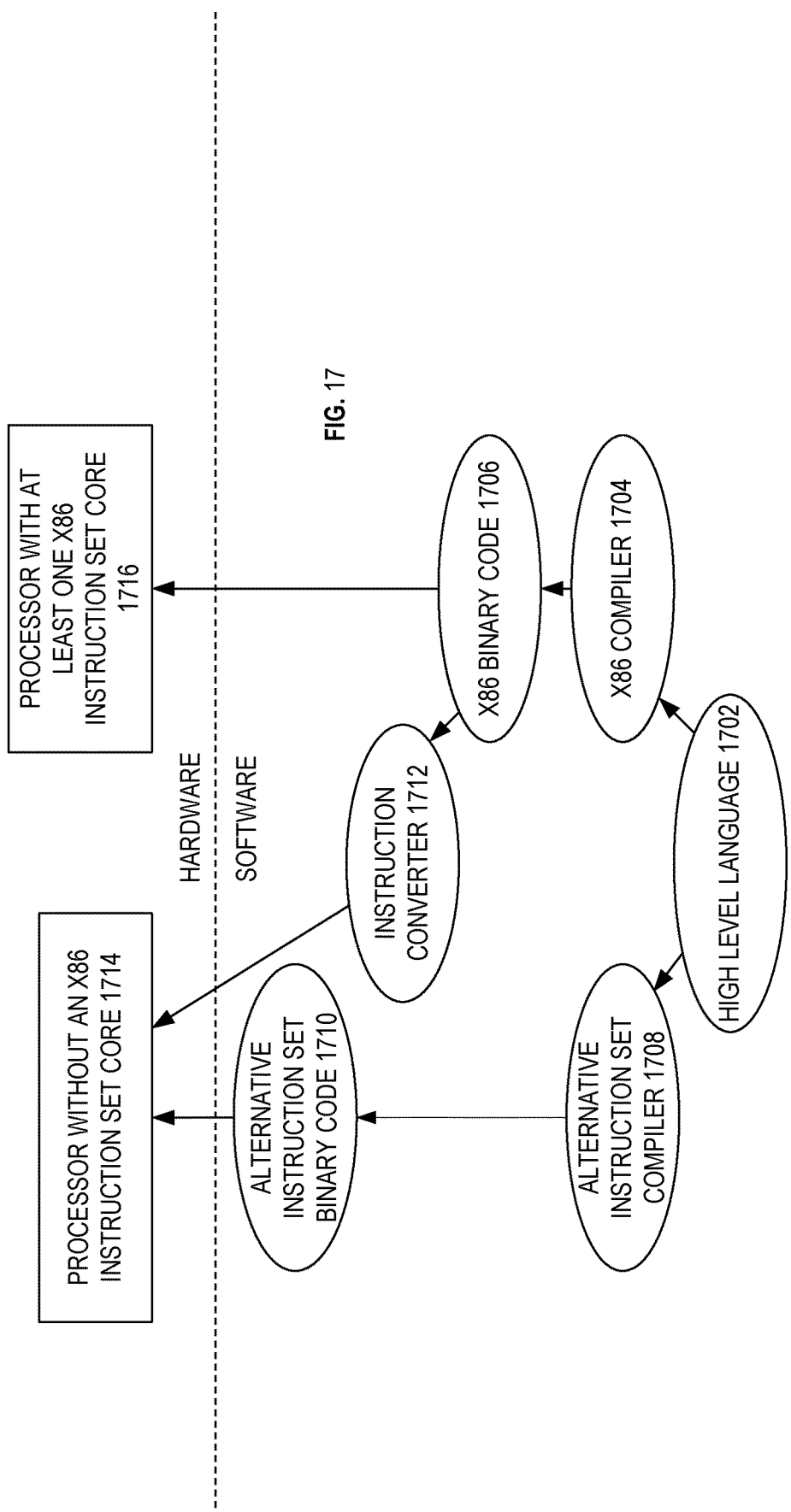

LOW SYNCH DEDICATED ACCELERATOR WITH IN-MEMORY COMPUTATION CAPABILITY

TECHNICAL FIELD

The present disclosure relates to processor architecture that features in-memory computation capability within processor memory.

BACKGROUND

Recognizing that data transfer rates from storage such as a magnetic or solid-state storage device is relatively slow, in-memory processing relies upon the transfer of data relevant to a decision-making process from such storage devices to system memory having a comparatively much higher data transfer rate. In memory processing is particularly useful in applications where relatively large quantities of intermediate decision-making data are generated. Such intermediate decision-making data is frequently written to storage then retrieved for subsequent processing. Neural networks, such as recursive neural networks may generate a large volume of intermediate data that is passed from layer to layer within the network. In addition, each layer may rely upon weight factors that are retrieved from data storage and, in the case of recursive neural networks updated and written to data storage. With an increasing dependence on graphics intensive processing using smaller form factor portable and mobile-platform processor-based devices, the ability to perform fixed or floating point mathematical operations using in-memory processing improves speed, efficiency an accuracy of neural network

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIGS. 7A-7B are block diagrams illustrating a generic vector friendly instruction format and instruction templates thereof according to embodiments of the invention;

FIGS. 8A-D are block diagrams illustrating an exemplary specific vector friendly instruction format according to embodiments of the invention;

FIG. 9 is a block diagram of a register architecture according to one embodiment of the invention;

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention;

FIG. 17 is a block diagram contrasting the use of a software instruction converter to convert binary instructions in a source instruction set to binary instructions in a target instruction set according to embodiments of the invention.

Figure 1:
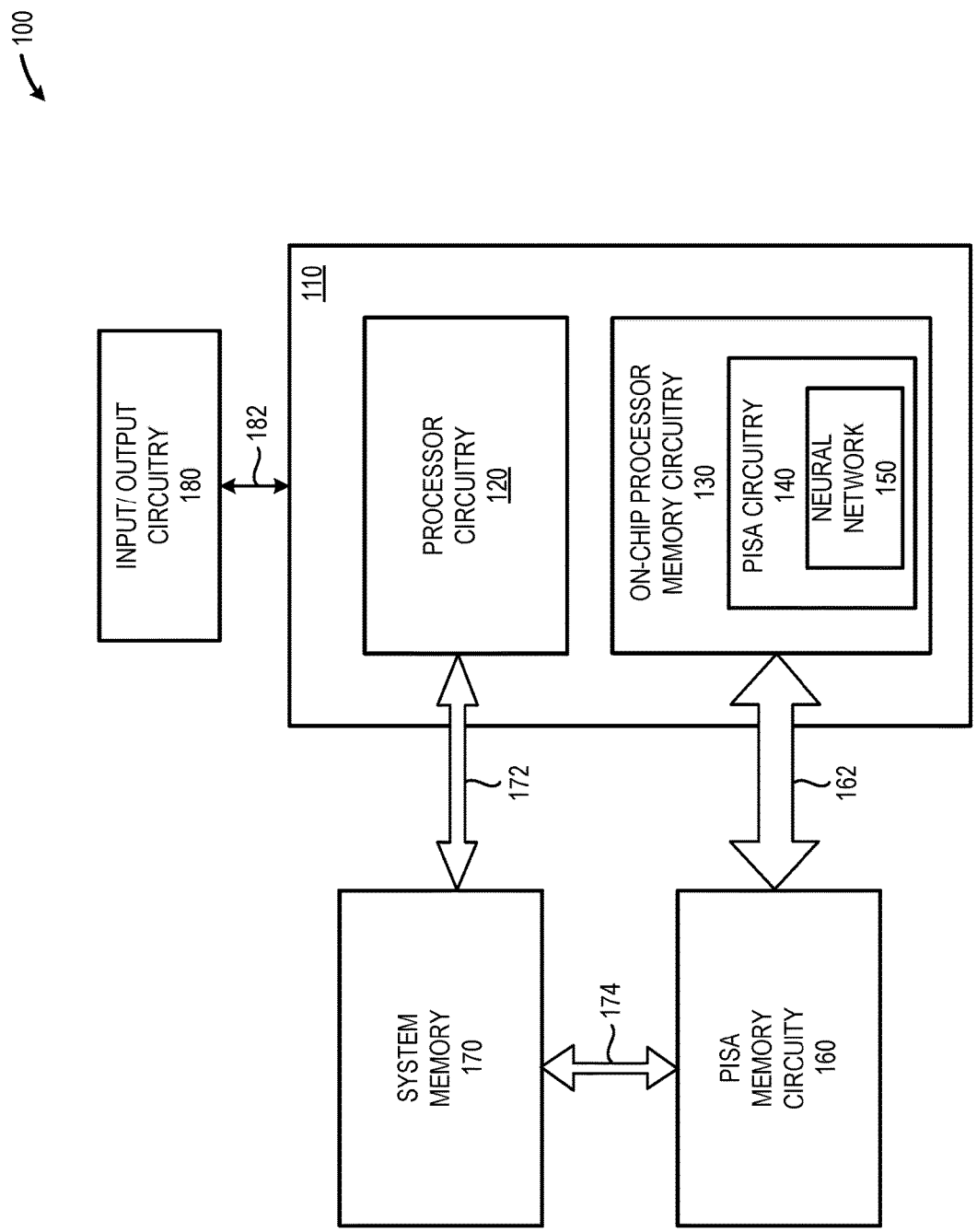
FIG. 1 is a block diagram of an illustrative system in which a semiconductor package includes processor circuitry and on-chip processor memory that includes static random access memory ("SRAM") configured to form pipelined SRAM architecture circuitry ("bit-serial PISA circuitry") capable of performing bit-serial, in-memory, mathematical operations defined by a multi-layer neural network model, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Recurrent neural networks process information sequentially, each layer of the neural network receives information (as input) from the preceding layer and passes along (as output) information to the subsequent neural network layer. Each of the layers included in the recurrent neural network incorporate all of the preceding information into the current calculation (e.g., information determined from $t_0$ to $t_{n-1}$ into the decision making at time=$t_n$). Recurrent neural networks have demonstrated success in many non-linear programming tasks. Recurrent neural networks are flexible and find use in language modeling and generating text, machine translation, speech recognition, and object location and identification.

Given the relatively large tensors generated by a recurrent neural network, the mathematical burden placed on processors is significant—slowing the output of the network. While delayed output may be acceptable in some situations, in many situations, such as object detection and avoidance in autonomous vehicles, an output delay is unacceptable and potentially hazardous. While expanding processor bandwidth by increasing clock speeds or multiplying the number of processing cores provide a potential solution, such solutions are costly and may increase the size and/or power consumption of a portable electronic device.

Another solution involves the use of memory to perform in-memory processing. For example, performing in-situ vector arithmetic operations within static random access memory (SRAM) arrays. The resulting architecture provides massive parallelism by repurposing thousands, or even more, of SRAM arrays into vector computation units. However, while such SRAM arrays are beneficial, over speed of the network is compromised by the sheer number of memory operations needed to support the implementation of the recurrent neural network.

The systems and methods described herein beneficially and advantageously increase the speed and efficiency of the in-memory processing by implementing the recurrent neural network model in on-chip processor memory (e.g., in the last level cache (LLC)) as a pipeline of SRAM arrays (hereinafter a "PISA" architecture) and by preloading the model and weights into memory locations having a high bandwidth pathway to the on-chip processor memory. Minimizing off-chip data transfer operations such as reads from memory and stores to memory improves the responsiveness of the recurrent neural network.

The systems and methods described herein provide for in-memory processing of recurrent neural networks using on-chip processor memory to: build recurrent neural network structure; store weights associated with the multi-layer recurrent neural network model; perform multi-layer computations associated with the neural network; and store intermediate output data generated by each of the neural network layers. The systems and methods described herein make use of pipelined static random access memory (SRAM) blocks in the on-chip processor memory. With bit-serial PISA, each of the pipelined SRAM arrays includes microcontroller circuitry that, using simple logical operations (e.g., AND/NOR) performed directly on the bit lines, causes each of the SRAM arrays to perform various mathematical operations (add, multiply, reduction, etc.) that include in a layer of a multi-layer neural network, such as a recurrent neural network.

The systems and methods described herein make use of direct memory access (DMA) control circuitry to transfer layer weights and/or input information that are associated with or define a multi-layer neural network from system memory to either: one or more storage locations having a high bandwidth data transfer capability with the on-chip processor memory; or directly to the on-chip processor memory. The DMA control circuitry also transfers output from the output layer of the recurrent neural network to system memory.

The systems and methods described herein typically receive the recurrent neural network model and input in a high level language provided by the system user. The systems and methods described herein include processor circuitry having compiler circuitry to convert at least a portion of the recurrent neural network model and input from the high level language to a domain specific language (DSL). The processor circuitry further includes additional compiler circuitry to convert at least a portion of the recurrent neural network model and input from the DSL to an instruction set architecture (ISA) suitable for configuring the bit-serial PISA disposed in the on-chip processor memory.

A system that includes bit-serial PISA circuitry to implement in-memory processing of a neural network using on-chip processor memory circuitry is provided. The system may include: processor circuitry; on-chip processor memory circuitry that includes a plurality of SRAM arrays, each of the SRAM arrays including microcontroller circuitry; neural network control circuitry to: receive an instruction set architecture (ISA) that includes data representative of a multi-layer neural network model and one or more neural network data inputs; form serially connected bit-serial PISA circuitry using at least a portion of the plurality of SRAM arrays, wherein each of the SRAM arrays included in the portion of the plurality of SRAM arrays represents a single layer of the multi-layer neural network model; cause a transfer of the ISA representative of each layer of the multi-layer neural network model to the microcontroller circuitry in a respective one of the portion of the plurality of SRAM arrays; cause a bidirectional transfer of neural network layer weights between the PISA memory circuitry and the portion of the plurality of SRAM arrays included in the serially connected bit-serial PISA circuitry; cause a transfer of the neural network input data from the PISA memory circuitry to the bit-serial PISA circuitry; and cause a transfer of output data from the serially connected bit-serial PISA circuitry to the PISA memory circuitry.

An in-memory neural network processing method is provided. The method may include: receiving, by neural network control circuitry coupled to processor circuitry, an instruction set architecture (ISA) that includes a multi-layer neural network model and neural network input data; serially coupling, by the neural network control circuitry, a plurality of SRAM arrays included in on-chip processor memory circuitry to provide bit-serial PISA circuitry, each of the plurality of SRAM arrays representing a single layer of the multi-layer neural network model and including respective microcontroller circuitry; causing, by the neural network control circuitry, a transfer of the ISA representative of each layer of the multi-layer neural network model to the microcontroller circuitry in a respective one of the plurality of SRAM arrays; causing, by the neural network control circuitry, a bidirectional transfer of neural network layer weights between each of the serially connected SRAM arrays forming the bit-serial PISA circuitry and PISA memory circuitry coupled to the bit-serial PISA circuitry via one or more high-bandwidth connections; causing, by the neural network control circuitry, a transfer of the ISA representative of the neural network input data from the PISA memory circuitry to the bit-serial PISA circuitry; and causing, by the neural network control circuitry, the bit-serial PISA circuitry to perform bit-serial, in-memory, neural network processing using the plurality of SRAM arrays; and causing, by the neural network control circuitry, a transfer of neural network output data from the bit-serial PISA circuitry to the PISA memory circuitry.

A non-transitory machine-readable storage medium having instructions is provided. The instructions, when executed by neural network control circuitry, may cause the neural network control circuitry to: receive, from communicably coupled processor circuitry, an instruction set architecture (ISA) that includes a multi-layer neural network model and neural network input data; serially couple a plurality of static random access memory (SRAM) arrays included in on-chip processor memory circuitry to provide pipelined SRAM architecture (bit-serial PISA) circuitry, each of the plurality of SRAM arrays representing a single layer of the multi-layer neural network model and including respective microcontroller circuitry; cause a transfer of the ISA representative of each layer of the multi-layer neural network model to the microcontroller circuitry in a respective one of the plurality of SRAM arrays; cause a bidirectional transfer of neural network layer weights between each of the serially connected SRAM arrays forming the bit-serial PISA circuitry and PISA memory circuitry coupled to the bit-serial PISA circuitry via one or more high-bandwidth connections; cause a transfer of the ISA representative of the neural network input data from the PISA memory circuitry to the bit-serial PISA circuitry; cause the bit-serial PISA circuitry to perform bit-serial, in-memory, neural network processing using the plurality of SRAM arrays; and cause a transfer of neural network output data from the bit-serial PISA circuitry to the PISA memory circuitry.

An in-memory neural network processing system is provided. The system may include: means for receiving an instruction set architecture (ISA) from processor circuitry, the ISA including a multi-layer neural network model and neural network input data; means for serially coupling a plurality of static random access memory (SRAM) arrays included in on-chip processor memory circuitry to provide pipelined SRAM architecture (bit-serial PISA) circuitry, each of the plurality of SRAM arrays representing a single layer of the multi-layer neural network model and including respective microcontroller circuitry; means for causing a transfer of the ISA representative of each layer of the multi-layer neural network model to the microcontroller circuitry in a respective one of the plurality of SRAM arrays; means for causing a bidirectional transfer of neural network layer weights between each of the serially connected SRAM arrays forming the bit-serial PISA circuitry and PISA memory circuitry coupled to the bit-serial PISA circuitry via one or more high-bandwidth connections; means for causing a transfer of the ISA representative of the neural network input data from the PISA memory circuitry to the bit-serial PISA circuitry; means for causing the bit-serial PISA circuitry to perform bit-serial, in-memory, neural network processing using the plurality of SRAM arrays; and means for causing a transfer of neural network output data from the bit-serial PISA circuitry to the PISA memory circuitry.

An electronic device capable of performing in-memory neural network processing using bit-serial PISA circuitry implemented in on-chip processor memory circuitry is provided. The electronic device may include: a circuit board; processor circuitry coupled to the circuit board; on-chip processor memory circuitry that includes a plurality of SRAM arrays, each of the SRAM arrays including microcontroller circuitry; bit-serial PISA circuitry coupled to the on-chip processor memory circuitry via one or more high-bandwidth connections; system memory; direct memory access control circuitry; and neural network control circuitry to: receive an instruction set architecture (ISA) that includes data representative of a multi-layer neural network model and one or more neural network data inputs; form serially connected bit-serial PISA circuitry using at least a portion of the plurality of SRAM arrays, wherein each of the SRAM arrays included in the portion of the plurality of SRAM arrays represents a single layer of the multi-layer neural network model; cause a transfer of the ISA representative of each layer of the multi-layer neural network model to the microcontroller circuitry in a respective one of the portion of the plurality of SRAM arrays; cause a bidirectional transfer of neural network layer weights between the PISA memory circuitry and the portion of the plurality of SRAM arrays included in the serially connected bit-serial PISA circuitry via the high-bandwidth connection; cause a transfer of the neural network input data from the PISA memory circuitry to the bit-serial PISA circuitry; and cause a transfer of output data from the serially connected bit-serial PISA circuitry to the PISA memory circuitry.

As used herein, the term "on-chip" or elements, components, systems, circuitry, or devices referred to as "on-chip" include such items integrally fabricated with the processor circuitry (e.g., a central processing unit, or CPU, in which the "on-chip" components are included, integrally formed, and/or provided by CPU circuitry) or included as separate components formed as a portion of a multi-chip module (MCM) or system-on-chip (SoC).

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 is a block diagram of an illustrative system 100 in which a semiconductor package 110 includes processor circuitry 120 and on-chip processor memory 130 incorporating pipelined static random access memory architecture circuitry (hereinafter, "bit-serial PISA circuitry") 140 capable of performing bit-serial, in-memory, mathematical operations associated with a multi-layer neural network 150, in accordance with at least one embodiment described herein. In embodiments, PISA memory circuitry 160 couples to the semiconductor package 110 via a relatively high-bandwidth connection 162. System memory circuitry 170 couples to the semiconductor package 110 and to the PISA memory circuitry 160 via relative low bandwidth connections 172 and 174, respectively. Input/output (I/O) interface circuitry 180 couples to the semiconductor package 110 via one or more connections 180.

In operation, a system user provides information and/or data representative of a multi-layer neural network model and/or multi-layer neural network input data to the system 100 via the I/O interface circuitry 180. Using the supplied model and inputs, the processor circuitry 120 directly or indirectly configures the bit-serial PISA circuitry 140 in the on-chip processor memory 130 to provide the neural network 150. In embodiments, the model and/or the inputs are transferred to the on-chip processor memory 130 via direct memory access ("DMA"). The processor circuitry 120 directly or indirectly initiates or causes a transfer of the weights associated with the neural network model from the system memory circuitry 170 to the PISA memory circuitry 160. In embodiments, some or all of the neural network layer weights are transferred between the system memory circuitry 170 and the PISA memory circuitry 160 via DMA.

As the neural network 150 executes, the data representative of the neural network layer weights and intermediate input/output values are rapidly transferred between the on-chip processor memory circuitry 130 and the PISA memory circuitry 160 via the relatively high bandwidth connection 162. In embodiments, the PISA memory circuitry 160 is disposed in whole or in part within the on-chip processor memory circuitry 130. In other embodiments, the PISA memory circuitry 160 may be disposed proximate the semiconductor package 110, for example collocated with the semiconductor package 110 in a multi-chip module or similar. The neural network 150 transfers output to the PISA memory circuitry 160. The use of the bit-serial PISA circuitry 140 advantageously increases the speed of the neural network 150 since all or a portion of the neural network layer weights and intermediate input/output data are stored or otherwise retained in PISA memory circuitry 160 and/or in the on-chip processor memory circuitry 130. The use of the bit-serial PISA circuitry 140 also beneficially enhances overall system performance since data transfers between the system memory circuitry 170 and the PISA memory circuitry 160 are accomplished via DMA. The above operations may be represented in system level pseudo-code by:

1. init_system (system initialization);
2. init_dma (initiate data transfer from system memory circuitry to PISA memory circuitry via DMA);
3. load_weights (load layer weights into neural network model);
4. load_layer_instructions;
5. compute_bit-serial PISA (compute neural network output).

The processor circuitry 120 may include any number and/or combination of currently available and/or future developed electronic components, semiconductor devices, and/or logic elements capable of executing instructions. The processor circuitry 120 may include any of a wide variety of commercially available processors, including without limitation, an AMD® Athlon®, Duron® or Opteron® processor; an ARM® application, embedded and secure processors; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Corei7®, Atom®, Itanium®, Pentium®, Xeon® or XScale® processor. Further, one or more of the processor circuits 120 may comprise a multi-core processor (whether the multiple cores coexist on the same or separate dies), and/or a multi-processor architecture of some other variety by which multiple physically separate processors are in some way linked.

The processor circuitry 120 may execute one or more instructions and/or may cause one or more other systems, sub-systems, modules, devices, or circuits to execute one or more instructions that cause the configuration of at least a portion of the on-chip processor memory circuitry 130 to provide the bit-serial PISA circuitry 140 that provides the hardware to implement the multi-layer neural network 150. The processor circuitry 120 may receive, via the I/O interface circuitry 180, the user supplied neural network model and/or the user supplied neural network input data. Based on the network model and/or the neural network input data, the processor circuitry 120 generates instructions in accordance with an instruction set architecture ("ISA") that is used by the PISA circuitry 140 to implement the neural network 150 in the on-chip processor memory circuitry 130. The processor circuitry 120 may execute instructions that directly or indirectly cause the transfer of layer weights and/or instructions executable by the bit-serial PISA circuitry 140 from the system memory circuitry 170 to the PISA memory circuitry 160. The processor circuitry 120 may execute instructions that directly or indirectly cause the transfer of layer weights and/or layer input/output data between the bit-serial PISA circuitry 140 and the PISA memory circuitry 160.

The on-chip processor memory 130 may include any number and/or combination of currently available and/or future developed electrical components, semiconductor devices, and/or logic elements capable of storing or otherwise retaining information and/or data. All or a portion of the on-chip processor memory circuitry 130 may be formed using static random access memory, or SRAM, circuitry. All or a portion of the on-chip processor memory circuitry 130 may include processor cache memory, such as processor last level cache (LLC) memory circuitry. The on-chip processor memory circuitry 130 stores or otherwise retains the bit-serial PISA circuitry 140 that implements the neural network 150. In embodiments, the on-chip processor memory circuitry 130 may include LLC memory circuitry having a storage capacity of: 8 megabytes (MB) or less; 16 MB or less; 32 MB or less; 64 MB or less; or 128 MB or less.

In embodiments, all or a portion of the on-chip processor memory circuitry 130 may be communicably coupled to the processor circuitry 120. In other embodiments, all or a portion of the on-chip processor memory circuitry 130 may be shared between multiple processor circuits $120_1$-$120_n$. In embodiments, the on-chip processor memory circuitry 130 may store information and/or data as a cache line, for example, as a 64-byte cache line. The on-chip processor memory circuitry 130 may bidirectionally communicate information and/or data to the processor circuitry 120.

The bit-serial PISA circuitry 140 includes a plurality of SRAM arrays disposed within the on-chip processor memory circuitry 130. The plurality of SRAM arrays forming the bit-serial PISA circuitry are communicably coupled in series to provide the input layer, output layer, and intervening hidden layers of the neural network 150. The bit-serial PISA circuitry 140 may include any number and or combination of SRAM arrays, where each SRAM array provides n-memory processing for the mathematical operations associated with a single layer in the neural network 150. For example, a five layer recurrent neural network 150 (one input layer, one output layer, three hidden layers) would be represented in bit-serial PISA circuitry 140 as five sequentially coupled SRAM arrays. The bit-serial PISA circuitry 140 bidirectionally couples to and communicates with the PISA memory circuitry 160 via the relatively high bandwidth connection 162. In embodiments, the bit-serial PISA circuitry 140 may store all or a portion of the interim data generated by one or more neural network layers (i.e., one or more SRAM arrays) in the PISA memory circuitry 160.

The PISA memory circuitry 160 includes any number and/or combination of currently available and/or future developed electrical components, semiconductor devices, and/or logic elements capable of storing or otherwise retaining information and/or data. The PISA memory circuitry 160 is communicably coupled to the bit-serial PISA circuitry 140 via a bus or similar connection 162 that provides a relatively high bandwidth coupling (i.e., a coupling that provides a relatively high data transfer rate) between the bit-serial PISA circuitry 140 and the PISA memory circuitry 160. The PISA memory circuitry 160 stores or otherwise retains information and/or data used by the neural network 150. Nonlimiting examples of such information and/or data include: the neural network mode; neural network weighting factors; neural network input data; neural network output data; and/or neural network intermediate data. In embodiments, the on-chip processor memory circuitry 130 provides all or a portion of the PISA memory circuitry 160. In embodiments, the PISA memory circuitry 160 may be disposed at least in part in, on, or about the semiconductor package 110. In embodiments, all or a portion of the PISA memory circuitry 160 may be off-chip, disposed external to the semiconductor package 110. In embodiments, an interconnect, such as a ring interconnect, serially interconnects at least a portion of the SRAM arrays used to provide the bit-serial, pipelined SRAM architecture (PISA) circuitry 140 used to implement the neural network 150.

The bit-serial PISA memory 160 is communicably coupled to the system memory circuitry 170 via a bus or similar connection 174 that provides a relatively low bandwidth pathway (i.e., a relatively low data transfer rate) between the system memory circuitry 170 and the PISA memory circuitry 160. Data transfer between the system memory circuitry 170 and the PISA memory circuitry may occur via direct memory access (DMA), bypassing the processor circuitry 120 and freeing the processor circuitry 120 for other tasks. In embodiments, the bit-serial PISA circuitry 140 writes the neural network output to the PISA memory circuitry 160 and transfers the neural network output via DMA to the system memory circuitry 170.

The system memory circuitry 170 may include any number and/or combination of currently available and/or future developed electronic components, semiconductor devices, and/or logic elements capable of storing or otherwise retaining information and/or data. The system memory circuitry 170 is communicably coupled to the processor circuitry 120 and/or to the semiconductor package 110 via a bus or similar connection 172 that provides a relatively low bandwidth pathway (i.e., a relatively low data transfer rate) between the system memory circuitry 170 and the processor circuitry 120 and/or to the semiconductor package 110.

The system memory circuitry 170 may be based on any of wide variety of information storage technologies, possibly including volatile technologies requiring the uninterrupted provision of electric power, and possibly including technologies entailing the use of machine-readable storage media that may be removable, or that may not be removable. Thus, the system memory circuitry 170 may include any of a wide variety of types of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although the system memory circuitry 170 is depicted as a single block in FIG. 1, the system memory circuitry 170 may include multiple storage devices that may be based on differing storage technologies.

The input/output interface circuitry 180 includes any number and/or combination of currently available and/or future developed electronic components, semiconductor devices, and/or logic elements capable of receiving input data from one or more input devices and/or communicating output data to one or more output devices. In embodiments, a system user provides neural network model and/or input data using one or more input devices. The user may provide the neural network model and/or input data in a high-level language that is converted by the processor circuitry 120 to an instruction set architecture (ISA) used to configure the bit-serial PISA circuitry 140.

Figure 2:
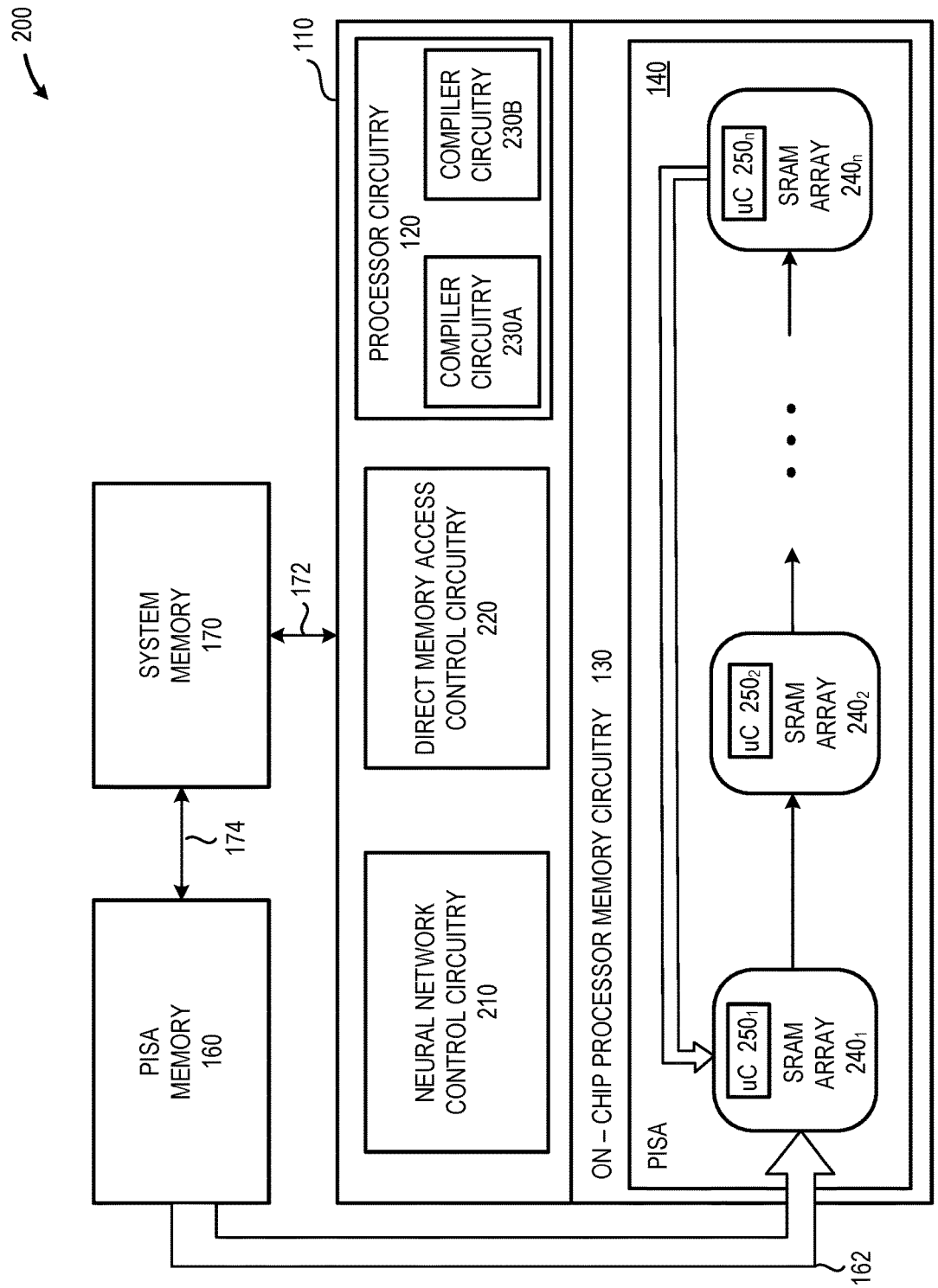
FIG. 2 is a block diagram of an illustrative in-memory neural network system where the on-chip processor memory includes bit-serial PISA circuitry formed using a plurality SRAM circuitry blocks (hereinafter, "SRAM arrays") and in which each SRAM array includes respective microcontroller circuitry to configure and/or control the operation of the SRAM array, in accordance with at least one embodiment described herein.

FIG. 2 is a block diagram of an illustrative in-memory neural network system 200 in which the on-chip processor memory 130 provides bit-serial PISA circuitry 140 that includes a plurality of SRAM arrays $240_1$-$240_n$, (collectively, "SRAM arrays 240") each having respective microcontroller circuitry $250_1$-$250_n$ (collectively, "SRAM microcontroller circuitry 250"), in accordance with at least one embodiment described herein. As depicted in FIG. 2, the system 200 may include neural network control circuitry 210 and direct memory access control circuitry 220. Also as depicted in FIG. 2, the processor circuitry 120 includes high-level compiler circuitry 230A to compile the high-level language, user supplied, neural network model and/or input data to an intermediate domain specific language (DSL). The processor circuitry 120 additionally includes low-level compiler circuitry 230B to compile the intermediate DSL neural network model and/or input to an instruction set architecture (IS) used to configure the neural network 150 in the bit-serial PISA circuitry 140.

The bit-serial PISA circuitry 140 includes the plurality of SRAM arrays 240. Each of the plurality of SRAM arrays 240 serially conductively couples to another of the SRAM arrays 240. Each of the SRAM arrays 240 represents one layer of a recurrent neural network 150. The microcontroller circuitry 250 in each SRAM array 240 configures the respective SRAM array to perform the mathematical operations, for example hit-serial computations, associated with the recurrent neural network layer represented by the SRAM array. In embodiments, the on-chip processor memory circuitry 130 may be configured to include any number of SRAM arrays 240. For example, the on-chip processor memory circuitry 130 be configured to include: 256 or more SRAM arrays; 512 or more SRAM arrays; 1024 or more SRAM arrays; 2048 or more SRAM arrays; 4096 or more SRAM arrays; or 8192 or more SRAM arrays. In embodiments, each of the plurality of SRAM arrays 240 will have the same size. For example, each of the plurality of SRAM arrays 240 may include: a 4 KB array; an 8 KB array; a 16 KB array; a 32 KB array; or a 64 KB array.

The neural network control circuitry 210 includes any number and/or combination of currently available and/or future developed electronic components, semiconductor devices, and/or logic elements capable of providing the recurrent neural network model to the SRAM microcontrollers 250, controlling the flow of information and/or data between the bit-serial PISA circuitry 140, PISA memory circuitry 160, and/or system memory circuitry 170; and/or controlling the flow, transfer, or communication of input data to and/or output data from the recurrent neural network 150. In embodiments, the processor circuitry 120 provides all or a portion of the neural network control circuitry 210. In other embodiments, the neural network control circuitry 210 may include stand-alone controller circuitry.

The DMA control circuitry 220 includes any number and/or combination of currently available and/or future developed electronic components, semiconductor devices, and/or logic elements capable of controlling the bidirectional flow of information and/or data between the system memory circuitry 170 and the PISA memory circuitry 160.

The high-level compiler circuitry 230A includes any number and/or combination of currently available and/or future developed electronic components, semiconductor devices, and/or logic elements capable of converting a neural network model and/or input data from a user supplied high-level language to an intermediate domain specific language (DSL), such as a data-flow graph of layer descriptors. The processor circuitry 120 may provide some or all of the high-level compiler circuitry 230A.

The low-level compiler circuitry 230B includes any number and/or combination of currently available and/or future developed electronic components, semiconductor devices, and/or logic elements capable of converting the neural network model and/or input data from the intermediate domain specific language (DSL) to an instruction set architecture (ISA). In embodiments, the neural network control circuitry 210 uses the neural network model and/or input data ISA to configure the recurrent neural network 150. In embodiments, each of the microcontroller circuits 250 uses the neural network model and/or input data ISA to configure their respective SRAM array 240 to form the recurrent neural network 150. The processor circuitry 120 may provide some or all of the low-level compiler circuitry 230B.

In operation, after the low-level compiler circuitry 230B converts the recurrent neural network model and/or input data to the ISA, the model data representative of each layer of the recurrent neural network 150 is loaded into the respective SRAM array 240. In embodiments, the low-level compiler circuitry 230B directly or indirectly provides, transfers, or otherwise communicates the recurrent neural network model data to the microcontroller circuitry 250 in the respective SRAM array 240. In other embodiments, the neural network control circuitry 210 provides, transfers, or otherwise communicates the recurrent neural network model data to the microcontroller circuitry 250 in the respective SRAM array 240.

In embodiments, the neural network control circuitry 210 causes the DMA control circuitry 220 to transfer at least a portion of the layer weights and/or layer inputs from the system memory circuitry 170 to the PISA memory circuitry 160. In other embodiments, the microcontroller circuitry 250 in some or all of the SRAM arrays 240 causes the DMA control circuitry 220 to transfer at least a portion of the layer weights and/or layer inputs from the system memory circuitry 170 to the PISA memory circuitry 160. In other embodiments, the processor circuitry 120 causes the DMA control circuitry 220 to transfer at least a portion of the layer weights and/or layer inputs from the system memory circuitry 170 to the PISA memory circuitry 160. Upon receipt in the PISA memory circuitry 160, the neural network control circuitry 210 and/or the microcontroller circuitry 250 in some or all of the SRAM arrays 240 causes the transfer of the data representative of the layer weights from the PISA memory circuitry 160 to respective ones of the plurality of SRAM arrays 240.

Upon configuration of the recurrent neural network in the bit-serial PISA circuitry 140, in some embodiments, the processor circuitry 120 may be placed into a sleep or standby mode while the DMA control circuitry continues to transfer data to the PISA memory circuitry 260 and/or to the bit-serial PISA circuitry 140. The bit-serial PISA circuitry 140 then loops over mini-batches by loading inputs for the first network layer from the PISA memory circuitry 160 and, for each serially subsequent layer, from the buffer in the immediately preceding SRAM array (e.g., input for SRAM array $240_1$ is loaded from the PISA memory circuitry 160 via the high bandwidth connection 162, and input for SRAM array $240_n$ is loaded from the buffer of SRAM array $240_{n-1}$). Using bit-serial computation, each of the plurality of SRAM arrays 240 determines the output for each respective layer of the recurrent neural network 150 and stores the output in a respective output buffer within the SRAM array 240.

Figure 3:
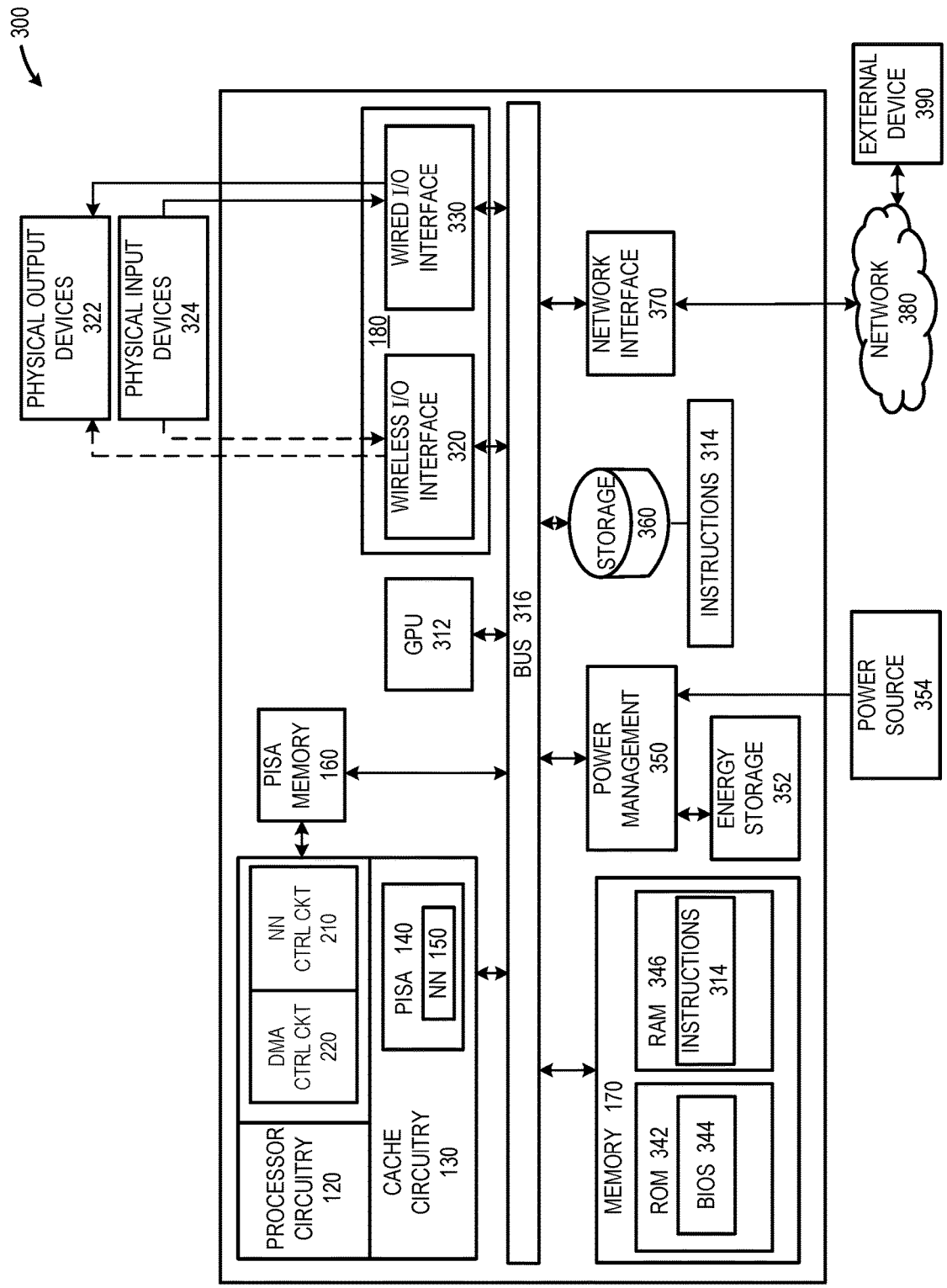
FIG. 3 is a schematic diagram of an illustrative electronic, processor-based, device that includes a semiconductor package that includes processor circuitry and on-chip processor memory circuitry (e.g., SRAM memory such as cache memory circuitry or LLC memory circuitry) configurable to provide the pipelined SRAM architecture (bit-serial PISA) circuitry to perform bit-serial, in-memory mathematical operations associated with a recurrent neural network model, in accordance with at least one embodiment described herein.

FIG. 3 is a schematic diagram of an illustrative electronic, processor-based, device 300 that includes a semiconductor package 110 that includes processor circuitry 120 and on-chip processor memory circuitry 130 (e.g., SRAM memory such as cache memory circuitry or LLC memory circuitry) configurable to provide pipelined SRAM architecture (bit-serial PISA) circuitry 140 capable of performing bit-serial mathematical operations to provide a recurrent neural network 150, in accordance with at least one embodiment described herein. The processor-based device 300 may additionally include one or more of the following: a graphical processing unit 312, a wireless input/output (I/O) interface 320, a wired I/O interface 330, system memory 170, power management circuitry 350, a non-transitory storage device 360, and a network interface 370. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, servers, blade server devices, workstations, and similar.

In some embodiments, the processor-based device 300 includes graphics processor circuitry 312 capable of executing machine-readable instruction sets and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 300 includes a bus or similar communications link 316 that communicably couples and facilitates the exchange of information and/or data between various system components including the processor circuitry 120, the graphics processor circuitry 312, one or more wireless I/O interfaces 320, one or more wired I/O interfaces 330, the system memory 170, one or more storage devices 360, and/or one or more network interfaces 370. The processor-based device 300 may be referred to in the singular herein, but this is not intended to limit the embodiments to a single processor-based device 300, since in certain embodiments, there may be more than one processor-based device 300 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

In embodiments, the processor circuitry 120 and the on-chip processor memory circuitry 130 are disposed in a semiconductor package 110. The semiconductor package 110 may additionally include the neural network control circuitry 210 and/or the DMA control circuitry 220. In some implementations, the processor circuitry 120 may provide all or a portion of either or both the neural network control circuitry 210 and/or the DMA control circuitry 220. The on-chip processor memory circuitry 130 includes the bit-serial PISA circuitry 140 that forms the recurrent neural network 150.

The system memory 170 may include read-only memory ("ROM") 342 and random access memory ("RAM") 346. A portion of the ROM 342 may be used to store or otherwise retain a basic input/output system ("BIOS") 344. The BIOS 344 provides basic functionality to the processor-based device 300, for example by causing the processor circuitry 120 to load and/or execute one or more machine-readable instruction sets 314. In embodiments, at least some of the one or more machine-readable instruction sets cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 300 may include at least one wireless input/output (I/O) interface 320. The at least one wireless I/O interface 320 may be communicably coupled to one or more physical output devices 322 (tactile devices, video displays, audio output devices, hardcopy output devices, etc.). The at least one wireless I/O interface 320 may communicably couple to one or more physical input devices 324 (pointing devices, touchscreens, keyboards, tactile devices, etc.). The at least one wireless I/O interface 320 may include any currently available or future developed wireless I/O interface. Example wireless I/O interfaces include, but are not limited to: BLUETOOTH®, near field communication (NFC), and similar.

The processor-based device 300 may include one or more wired input/output (I/O) interfaces 330. The at least one wired I/O interface 330 may be communicably coupled to one or more physical output devices 322 (tactile devices, video displays, audio output devices, hardcopy output devices, etc.). The at least one wired I/O interface 330 may be communicably coupled to one or more physical input devices 224 (pointing devices, touchscreens, keyboards, tactile devices, etc.). The wired I/O interface 330 may include any currently available or future developed I/O interface. Example wired I/O interfaces include but are not limited to: universal serial bus (USB), IEEE 1394 ("FireWire"), and similar.

The processor-based device 300 may include one or more communicably coupled, non-transitory, data storage devices 360. The data storage devices 360 may include one or more hard disk drives (HDDs) and/or one or more solid-state storage devices (SSDs). The one or more data storage devices 360 may include any current or future developed storage appliances, network storage devices, and/or systems. Non-limiting examples of such data storage devices 360 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 360 may include one or more removable storage devices, such as one or more flash drives, flash memories, flash storage units, or similar appliances or devices capable of communicable coupling to and decoupling from the processor-based device 200.

The one or more data storage devices 360 may include interfaces or controllers (not shown) communicatively coupling the respective storage device or system to the bus 316. The one or more data storage devices 360 may store, retain, or otherwise contain machine-readable instruction sets, data structures, program modules, data stores, databases, logical structures, and/or other data useful to the processor circuitry 120 and/or graphics processor circuitry 312 and/or one or more applications executed on or by the processor circuitry 120 and/or graphics processor circuitry 312. In some instances, one or more data storage devices 360 may be communicably coupled to the processor circuitry 120, for example via the bus 316 or via one or more wired communications interfaces 330 (e.g., Universal Serial Bus or USB); one or more wireless communications interfaces 320 (e.g., Bluetooth®, Near Field Communication or NFC); and/or one or more network interfaces 370 (IEEE 802.3 or Ethernet, IEEE 802.11, or WiFi®, etc.).

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 120, the storage device 360, the system memory 170, the graphics processor circuitry 312, the wireless I/O interface 320, the wired I/O interface 330, the power management circuitry 350, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In another example, one or more of the above-described components may be integrated into the semiconductor package 110 and/or the graphics processor circuitry 312. In some embodiments, all or a portion of the bus 316 may be omitted and the components are coupled directly to each other using suitable wired or wireless connections.

Figure 4:
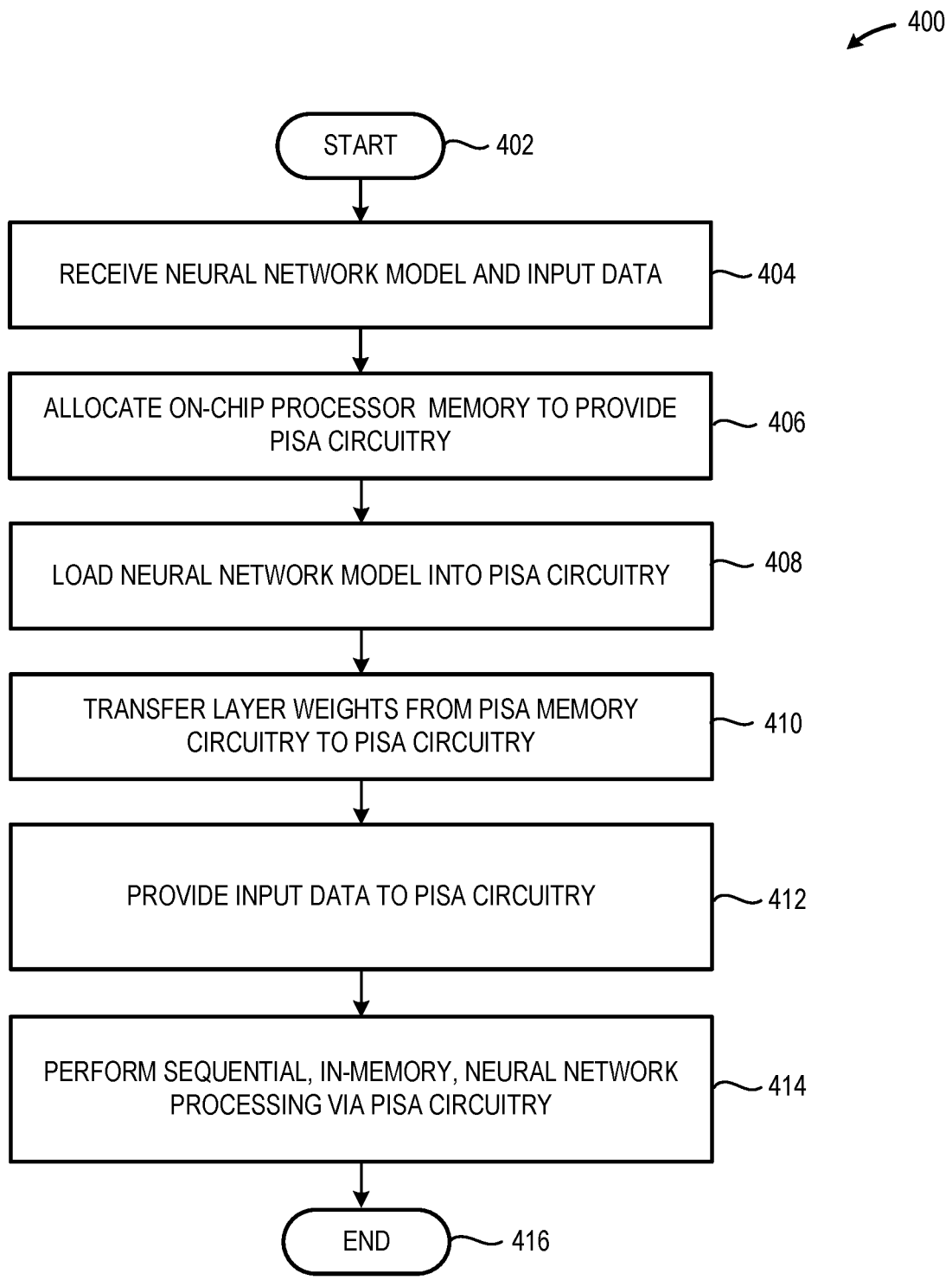
FIG. 4 is a high-level flow diagram of an illustrative method of implementing a recurrent neural network using pipelined SRAM architecture (bit-serial PISA) circuitry implemented in on-chip processor memory circuitry, in accordance with at least one embodiment described herein.

FIG. 4 is a high-level flow diagram of an illustrative method 400 of implementing a recurrent neural network 150 using pipelined SRAM architecture (bit-serial PISA) circuitry 140 implemented in on-chip processor memory circuitry 130, in accordance with at least one embodiment described herein. Executing the neural network 150 using bit-serial mathematical in on-chip processor memory circuitry 130 leverages the available on-chip SRAM memory, greatly expanding the vector/tensor processing capability of the system. Implementing the neural network 150 as bit-serial PISA circuitry 140 using on-chip processor memory circuitry 130 and coupling the bit-serial PISA circuitry to PISA memory circuitry 160 using a relatively high bandwidth connection 162 advantageously reduces the delays caused by the repeated transfers of weight data, layer input data, and layer output between the processor circuitry and system memory in a conventional processor-based neural network. The method 400 commences at 402.

At 404, the system 100 receives data representative of a neural network model and neural network input data for the neural network model. In embodiments, the neural network model includes data representative of a recurrent neural network 150. A system user may provide the data representative of a neural network model and neural network input data in the form of a high-level language instruction set. The processor circuitry 120 converts the neural network model and neural network input data from the high-level language instruction set to an instruction set architecture (ISA) implementable by at least one of: the neural network control circuitry 210 and/or the microcontroller circuitry 250 disposed in each SRAM array 240. In embodiments, the processor circuitry 120 may store all or a portion of the ISA neural network model and/or neural network input data in the system memory circuitry 170.

At 406, at least one of the processor circuitry 120 and/or the neural network control circuitry 210 allocates SRAM arrays 240 included in the bit-serial PISA circuitry 140 to implement the neural network 150. The SRAM arrays 240 are disposed in the on-chip processor memory circuitry 130. In embodiments, the SRAM arrays 240 are disposed in processor cache memory circuitry, such as SRAM memory array circuitry included in the processor last level cache (LLC) circuitry 130.

At 408, at least one of the processor circuitry 120 and/or the neural network control circuitry 210 causes a transfer of each layer of the neural network model $150_1$-$150_n$ in the ISA to the microcontroller circuitry $250_1$-$250_n$ in a respective one of the plurality of SRAM arrays $240_1$-$240_n$ (where "n" represents the total number of layers included in the neural network 150). The microcontroller circuitry 250 configures the memory elements included in the array to perform mathematical operations (add, multiply, reduction, etc.) using the received neural network model ISA for the neural network layer implemented by the respective SRAM array 240. In embodiments, the microcontroller circuitry 250 also configures input buffer circuitry and/or output buffer circuitry within the SRAM array 240.

In embodiments, at least one of the processor circuitry 120 and/or the neural network control circuitry 210 causes the DMA control circuitry 220 to initiate a DMA transfer of each layer of the neural network model $150_1$-$150_n$ from the system memory circuitry 170 to the PISA memory circuitry 160. The PISA memory circuitry 160 then transfers each layer of the neural network model $150_1$-$150_n$ to the microcontroller circuitry 250 in respective ones of the SRAM arrays 240. In other embodiments, the processor circuitry 120 causes the DMA control circuitry 220 to initiate a DMA transfer of each layer of the neural network model $150_1$-$150_n$ from the system memory circuitry 170 directly to the microcontroller circuitry 250 in respective ones of the SRAM arrays 240.

At 410, at least one of the processor circuitry 120 and/or the neural network control circuitry 210 causes the DMA control circuitry 220 to initiate a DMA transfer of layer weights from system memory circuitry 170 to the PISA memory circuitry 160. Transferring the layer weights from system memory circuitry 170 to the PISA memory circuitry 160 beneficially allows the neural network 150 to update and load layer weights via the relatively high bandwidth connection 162, whereas if the layer weights were maintained in the system memory circuitry 170 such updates and loads would be temporally limited by the relatively low bandwidth connections 172, 174 between the bit-serial PISA circuitry 140 and the system memory circuitry 170. At least one of the neural network control circuitry 210 and/or the microcontroller circuitry 250 in each SRAM array 240 causes the bidirectional transfer of layer weight data between the PISA memory circuitry 160 and the microcontroller circuitry 250 in some or all of the SRAM arrays 240.

At 412, at least one of the processor circuitry 120 and/or the neural network control circuitry 210 causes the transfer of the neural network input data to the input layer of the neural network. In embodiments, at least one of processor circuitry 120 and/or the neural network control circuitry 210 causes the transfer of the neural network input data from the system memory circuitry 170 to the input layer of the neural network. In other embodiments, at least one of processor circuitry 120 and/or the neural network control circuitry 210 causes the transfer of the neural network input data from the PISA memory circuitry 160 to the input layer of the neural network. The SRAM arrays 240 that provide the input and hidden layers of the neural network 150 include output buffers to store output data. Since the SRAM arrays 240 are coupled sequentially, the subsequent SRAM array $240_n$ receives layer input data from the output buffer in the immediately preceding SRAM array $240_{n-1}$.

At 414, each SRAM array 240, using the model loaded at 408 and the weights loaded at 410, performs a bit-serial compute on the received input data and stores the resultant output data in one or more output buffers. The method 400 concludes at 416.

Figure 5:
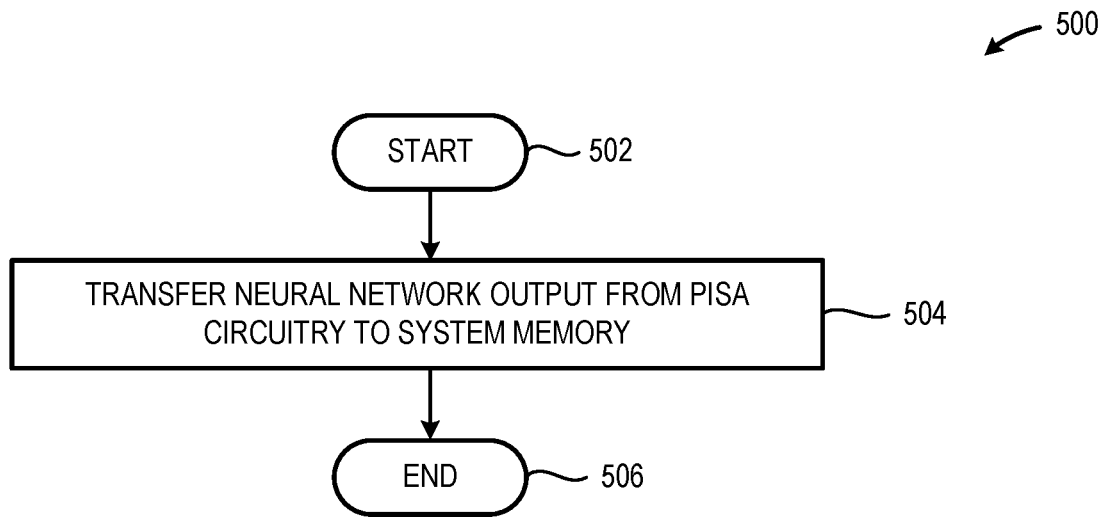
FIG. 5 is a high-level flow diagram of an illustrative method of transferring output data generated at the output layer of the multi-layer neural network from the bit-serial PISA circuitry to system memory circuitry, in accordance with at least one embodiment described herein.

FIG. 5 is a high-level flow diagram of an illustrative method 500 of transferring output data generated at the output layer of the neural network 150 from the bit-serial PISA circuitry 140 to system memory circuitry 170, in accordance with at least one embodiment described herein. The method 500 may be used in conjunction with the method 400 described in detail above with regard to FIG. 4. The method 500 commences at 502.

At 504, at least one of the neural network control circuitry 210 and/or the microcontroller circuitry 250 causes the transfer the neural network output data generated at the SRAM array 240 providing the output layer of the neural network to the system memory circuitry 170. In embodiments, the neural network control circuitry 210 causes the transfer of the output data from the bit-serial PISA circuitry 140 to the PISA memory circuitry 160 via the high-bandwidth connection 162 and the DMA control circuitry 220 causes the transfer, via DMA, of the output data from the PISA memory circuitry 160 to the system memory circuitry 170. In other embodiments, at least one of the neural network control circuitry 210 and/or the microcontroller circuitry 250 causes the transfer the neural network output data from the bit-serial PISA circuitry 140 to the system memory circuitry 170. The method 500 concludes at 506.

Figure 6:
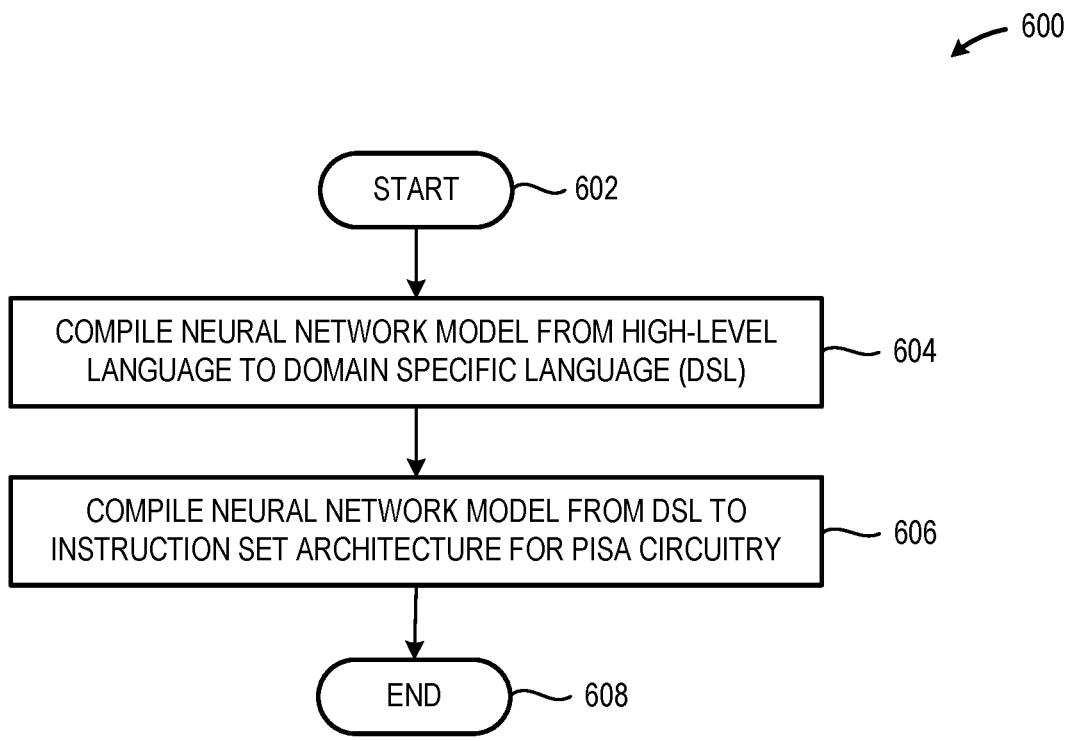
FIG. 6 is a high-level flow diagram of an illustrative method of compiling the high-level language neural network model and/or input data to the instruction set architecture (ISA) implemented by the bit-serial PISA circuitry using high-level compiler circuitry and low-level compiler circuitry, in accordance with at least one embodiment described herein.

FIG. 6 is a high-level flow diagram of an illustrative method 600 of compiling the high-level language neural network model and/or input data to the instruction set architecture (ISA) implemented by the bit-serial PISA circuitry 140 using high-level compiler circuitry 230A and low-level compiler circuitry 230B, in accordance with at least one embodiment described herein. The method 600 may be used in conjunction with either or both the method 400 described in detail above with regard to FIG. 4 and/or the method 500 described in detail above with regard to FIG. 5. The method 600 commences at 602.

At 604, high-level compiler circuitry 230A compiles the user-supplied neural network model and/or the user supplied neural network input data from the high-level language to an intermediate domain specific language (DSL). In embodiments, the high-level compiler circuitry 230A compiles the user-supplied neural network model and/or the user supplied neural network input data from the high-level language to an intermediate DSL such as a data-flow graph of layer descriptors.

At 606, low-level compiler circuitry 230B compiles the neural network model and/or the user supplied neural network input data from the intermediate domain specific language (DSL) to an instruction set architecture (ISA) that can be implemented by the bit-serial PISA circuitry 140 disposed in the on-chip processor memory circuitry 130. The method 600 concludes at 608.

While FIGS. 4, 5, and 6 illustrate various operations according to one or more embodiments, it is to be understood that not all of the operations depicted in FIGS. 4, 5, and 6 are necessary for other embodiments. Indeed, it is fully contemplated herein that in other embodiments of the present disclosure, the operations depicted in FIGS. 4, 5, and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 7B:
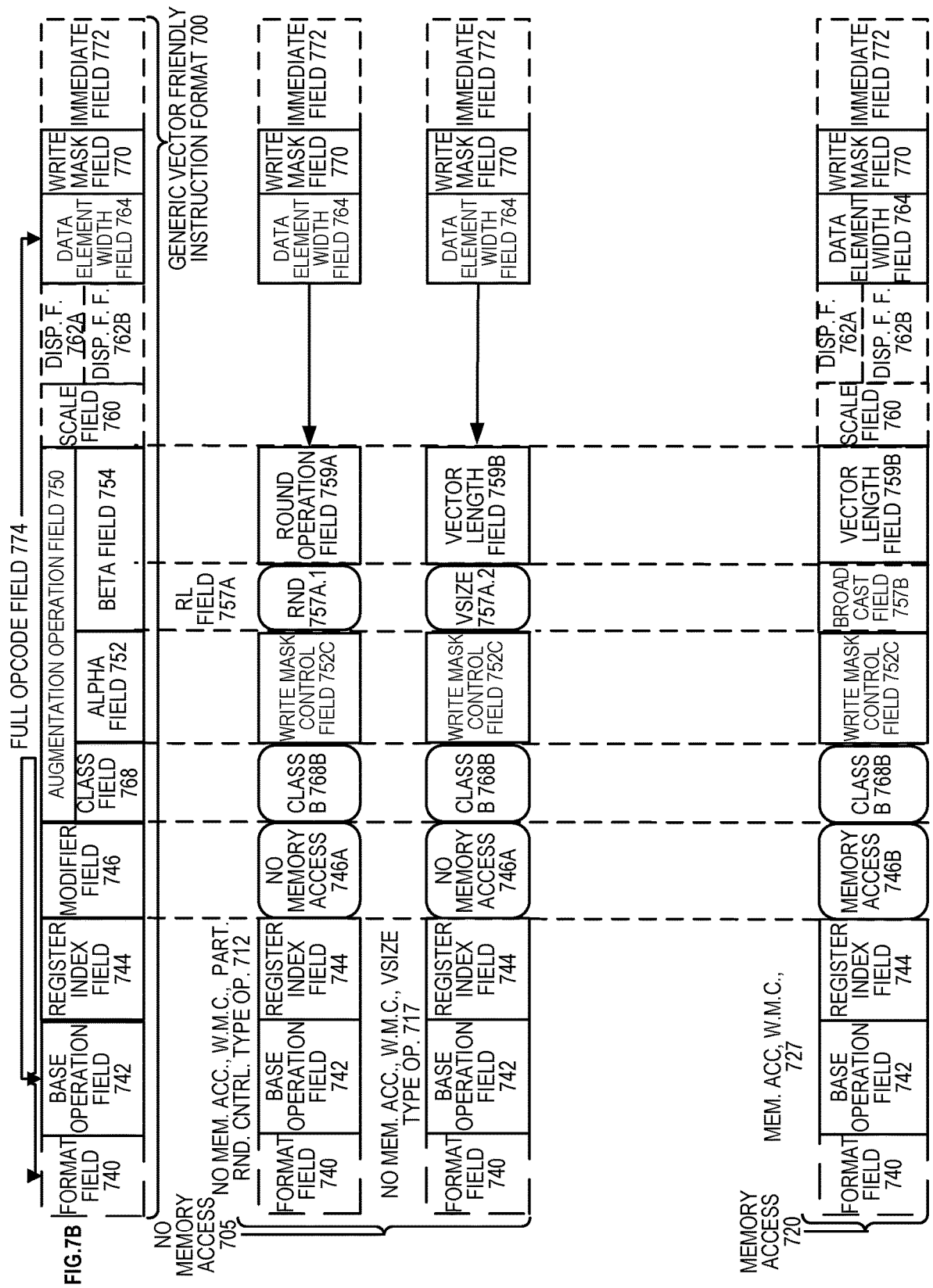

FIGS. 7A-7B are block diagrams illustrating a generic vector friendly instruction format and instruction templates thereof according to embodiments of the invention. FIG. 7A is a block diagram illustrating a generic vector friendly instruction format and class A instruction templates thereof according to embodiments of the invention; while FIG. 7B is a block diagram illustrating the generic vector friendly instruction format and class B instruction templates thereof according to embodiments of the invention. Specifically, a generic vector friendly instruction format 700 for which are defined class A and class B instruction templates, both of which include no memory access 705 instruction templates and memory access 720 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7A include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, non-temporal 730 instruction template. The class B instruction templates in FIG. 7B include: 1) within the no memory access 705 instruction templates there is shown a no memory access, write mask control, partial round control type operation 712 instruction template and a no memory access, write mask control, vsize type operation 717 instruction template; and 2) within the memory access 720 instruction templates there is shown a memory access, write mask control 727 instruction template.

The generic vector friendly instruction format 700 includes the following fields listed below in the order illustrated in FIGS. 7A-7B.

Format field 740—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 750—its content distinguishes which one of a variety of different operations to be performed in addition to the base operation. This field is context specific. In one embodiment of the invention, this field is divided into a class field 768, an alpha field 752, and a beta field 754. The augmentation operation field 750 allows common groups of operations to be performed in a single instruction rather than 2, 3, or 4 instructions.

Scale field 760—its content allows for the scaling of the index field's content for memory address generation (e.g., for address generation that uses $2^{scale}*index+base$).

Displacement Field 762A—its content is used as part of memory address generation (e.g., for address generation that uses $2^{scale}*index+base+displacement$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the invention are described in which the write mask field's 770 content selects one of a number of write mask registers that contains the write mask to be used (and thus the write mask field's 770 content indirectly identifies that masking to be performed), alternative embodiments instead or additional allow the mask write field's 770 content to directly specify the masking to be performed.

Immediate field 772—its content allows for the specification of an immediate. This field is optional in the sense that is it not present in an implementation of the generic vector friendly format that does not support immediate and it is not present in instructions that do not use an immediate.

Class field 768—its content distinguishes between different classes of instructions. With reference to FIGS. 7A-B, the contents of this field select between class A and class B instructions. In FIGS. 7A-B, rounded corner squares are used to indicate a specific value is present in a field (e.g., class A 768A and class B 768B for the class field 768 respectively in FIGS. 7A-B).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No-Memory Access Instruction Templates—Full Round Control Type Operation

In the no memory access full round control type operation 710 instruction template, the beta field 754 is interpreted as a round control field 754A, whose content(s) provide static rounding. While in the described embodiments of the invention the round control field 754A includes a suppress all floating point exceptions (SAE) field 756 and a round operation control field 758, alternative embodiments may support may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating-point exception flag and does not raise any floating point exception handler.

Round operation control field 758—its content distinguishes which one of a group of rounding operations to perform (e.g., Round-up, Round-down, Round-towards-zero and Round-to-nearest). Thus, the round operation control field 758 allows for the changing of the rounding mode on a per instruction basis. In one embodiment of the invention where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7A, temporal 752B.1 and non-temporal 752B.2 are respectively specified for the memory access, temporal 725 instruction template and the memory access, non-temporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale filed 762B are not present.

In the no memory access, write mask control, partial round control type operation 710 instruction template, the rest of the beta field 754 is interpreted as a round operation field 759A and exception event reporting is disabled (a given instruction does not report any kind of floating-point exception flag and does not raise any floating point exception handler).

Round operation control field 759A—just as round operation control field 758, its content distinguishes which one of a group of rounding operations to perform (e.g., Round-up, Round-down, Round-towards-zero and Round-to-nearest). Thus, the round operation control field 759A allows for the changing of the rounding mode on a per instruction basis. In one embodiment of the invention where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted the vector length field 759B. The memory access 720 instruction templates include the scale field 760, and optionally the displacement field 762A or the displacement scale field 762B.

With regard to the generic vector friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 8 is a block diagram illustrating an exemplary specific vector friendly instruction format according to embodiments of the invention. FIG. 8 shows a specific vector friendly instruction format 800 that is specific in the sense that it specifies the location, size, interpretation, and order of the fields, as well as values for some of those fields. The specific vector friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 7 into which the fields from FIG. 8 map are illustrated.

It should be understood that, although embodiments of the invention are described with reference to the specific vector friendly instruction format 800 in the context of the generic vector friendly instruction format 700 for illustrative purposes, the invention is not limited to the specific vector friendly instruction format 800 except where claimed. For example, the generic vector friendly instruction format 700 contemplates a variety of possible sizes for the various fields, while the specific vector friendly instruction format 800 is shown as having fields of specific sizes. By way of specific example, while the data element width field 764 is illustrated as a one bit field in the specific vector friendly instruction format 800, the invention is not so limited (that is, the generic vector friendly instruction format 700 contemplates other sizes of the data element width field 764).

The generic vector friendly instruction format 700 includes the following fields listed below in the order illustrated in FIG. 8A.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector friendly instruction format in one embodiment of the invention).

The second-fourth bytes (EVEX Bytes 1-3) include a number of bit fields providing specific capability.

REX field 805 (EVEX Byte 1, bits [7-5])—consists of a EVEX.R bit field (EVEX Byte 1, bit [7]-R), EVEX.X bit field (EVEX byte 1, bit [6]-X), and 757BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (0F, 0F 38, or 0F 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1 s complement) form. Depending on the instruction, an extra different EVEX bit field is used to extend the specifier size to 32 registers.

EVEX.U 768 Class field (EVEX byte 2, bit [2]-U)—If EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

Scale, Index, Base (SIB) Byte (Byte 6)—As previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

FIG. 8B is a block diagram illustrating the fields of the specific vector friendly instruction format 800 that make up the full opcode field 774 according to one embodiment of the invention. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

FIG. 8C is a block diagram illustrating the fields of the specific vector friendly instruction format 800 that make up the register index field 744 according to one embodiment of the invention. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
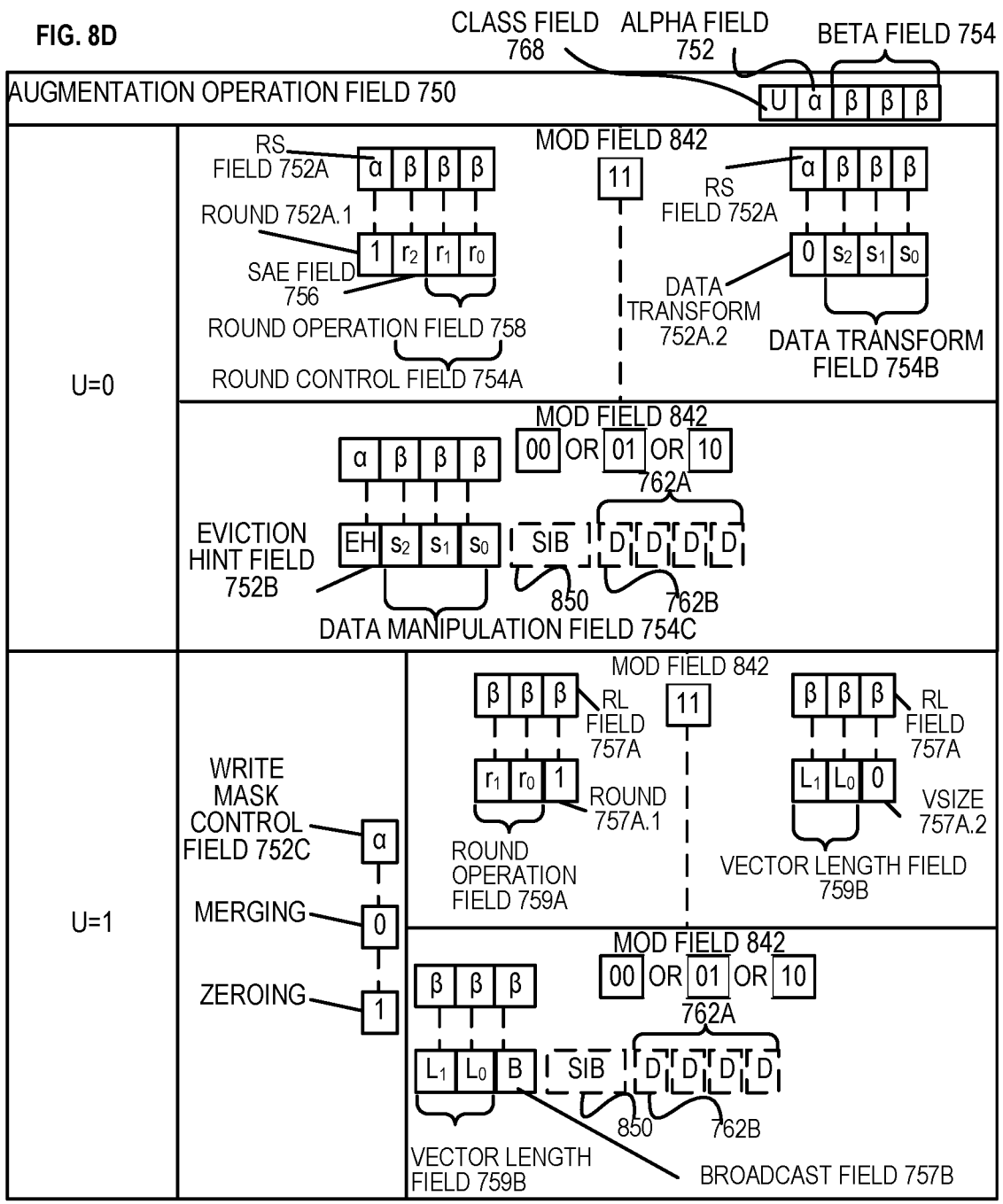

FIG. 8D is a block diagram illustrating the fields of the specific vector friendly instruction format 800 that make up the augmentation operation field 750 according to one embodiment of the invention. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-$S_0$) is interpreted as the RL field 757A; when it contains a 1 (round 757A.1) the rest of the beta field 754 (EVEX byte 3, bit [6-5]-$S_{2-1}$) is interpreted as the round operation field 759A, while when the RL field 757A contains a 0 (VSIZE 757.A2) the rest of the beta field 754 (EVEX byte 3, bit [6-5]-$S_{2-1}$) is interpreted as the vector length field 759B (EVEX byte 3, bit [6-5]-$L_{1-0}$). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-$L_{1-0}$) and the broadcast field 757B (EVEX byte 3, bit [4]-B).

Exemplary Register Architecture

FIG. 9 is a block diagram of a register architecture 900 according to one embodiment of the invention. In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 800 operates on these overlaid register file as illustrated in the below tables.

| Adjustable Vector Length | Class | Operations | Registers |
|---|---|---|---|
| Instruction Templates that do not include the vector length field 759B | A (FIG. 7A; U = 0) | 710, 715, 725, 730 | zmm registers (the vector length is 64 byte) |
| | B (FIG. 7B; U = 1) | 712 | zmm registers (the vector length is 64 byte) |
| Instruction templates that do include the vector length field 759B | B (FIG. 7B; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instructions templates without the vector length field 759B operate on the maximum vector length. Further, in one embodiment, the class B instruction templates of the specific vector friendly instruction format 800 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 915—in the embodiment illustrated, there are 8 write mask registers (k0 through k7), each 64 bits in size. In an alternate embodiment, the write mask registers 915 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 925—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. The core 1090 may additionally include SRAM circuitry having a different ISA suitable of implementation as bit-serial PISA circuitry 140 formed in the on-chip processor memory circuitry 130. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
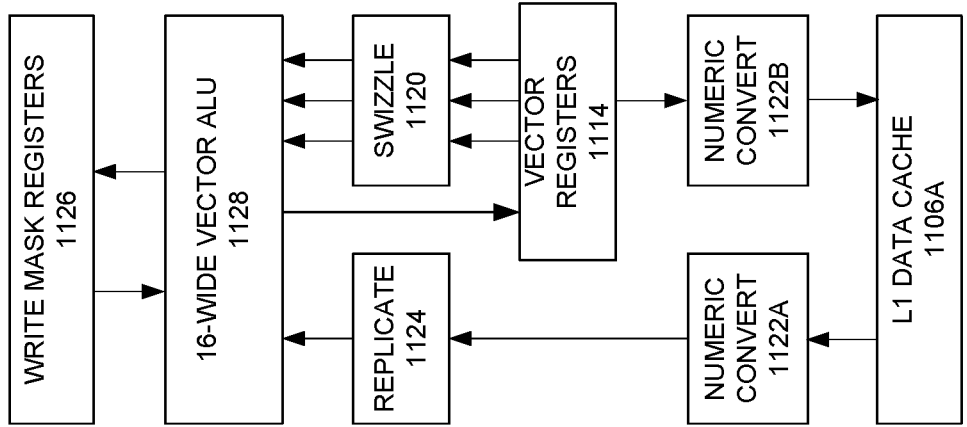
FIGS. 11A-B illustrate a block diagram of a more specific exemplary in-order core architecture, which core would be one of several logic blocks (including other cores of the same type and/or different types) in a chip.
Figure 11A:
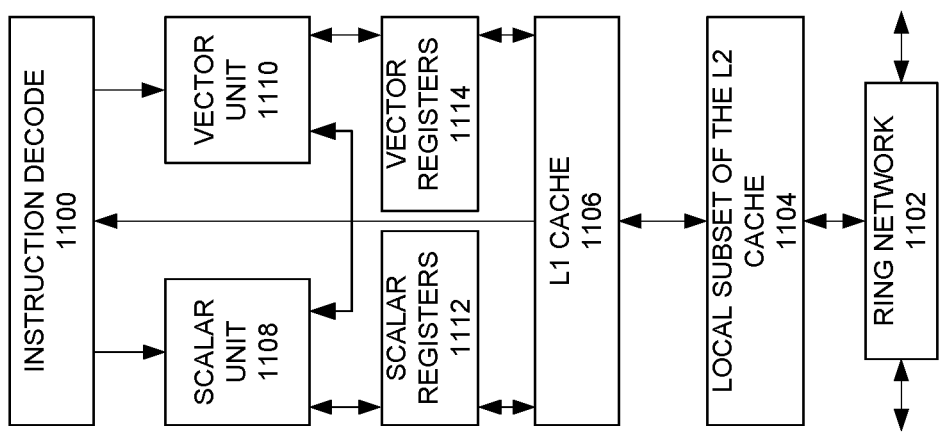

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
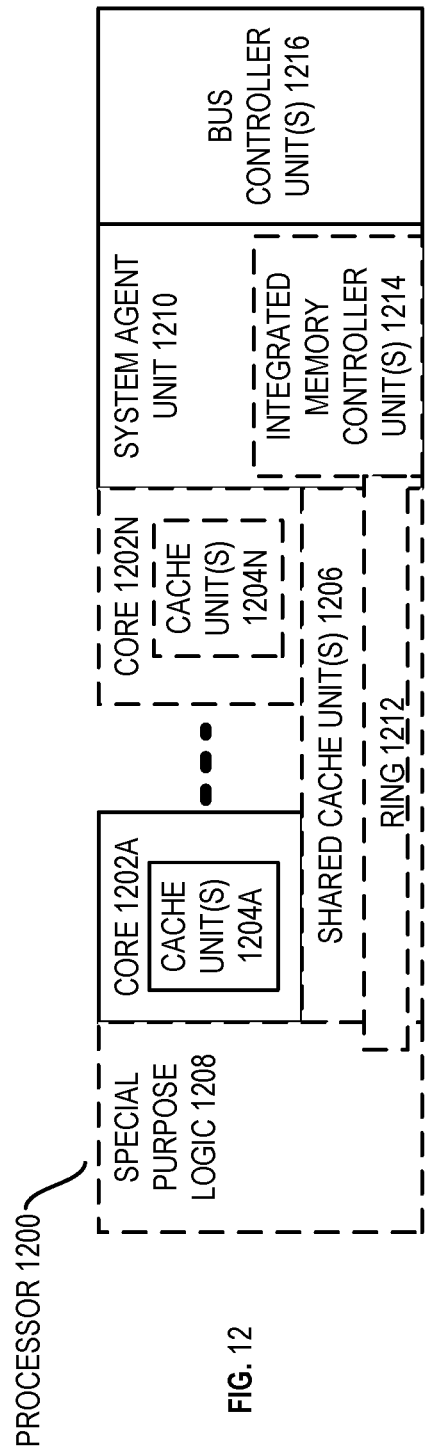
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
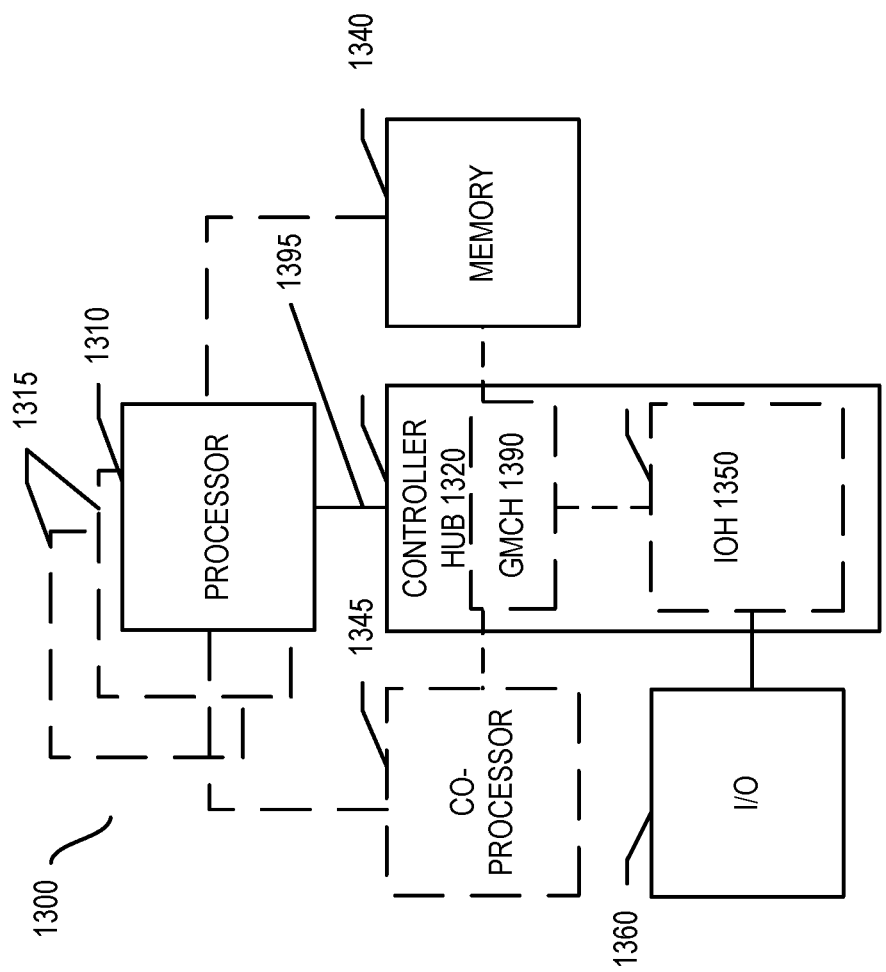
FIGS. 13, 14, 15, and 16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor (s) 1345 accept and execute the received coprocessor instructions.

Figure 14:
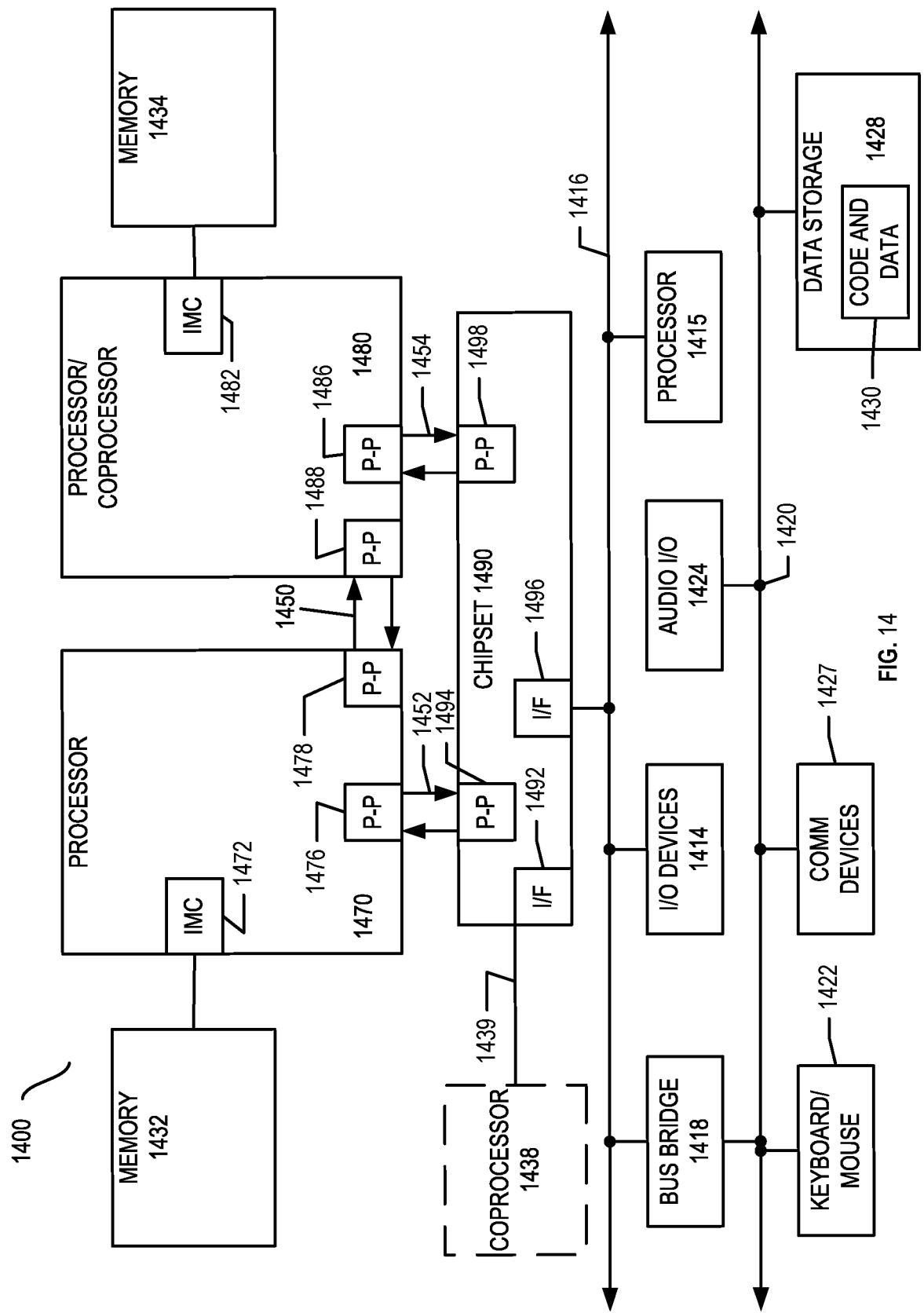

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
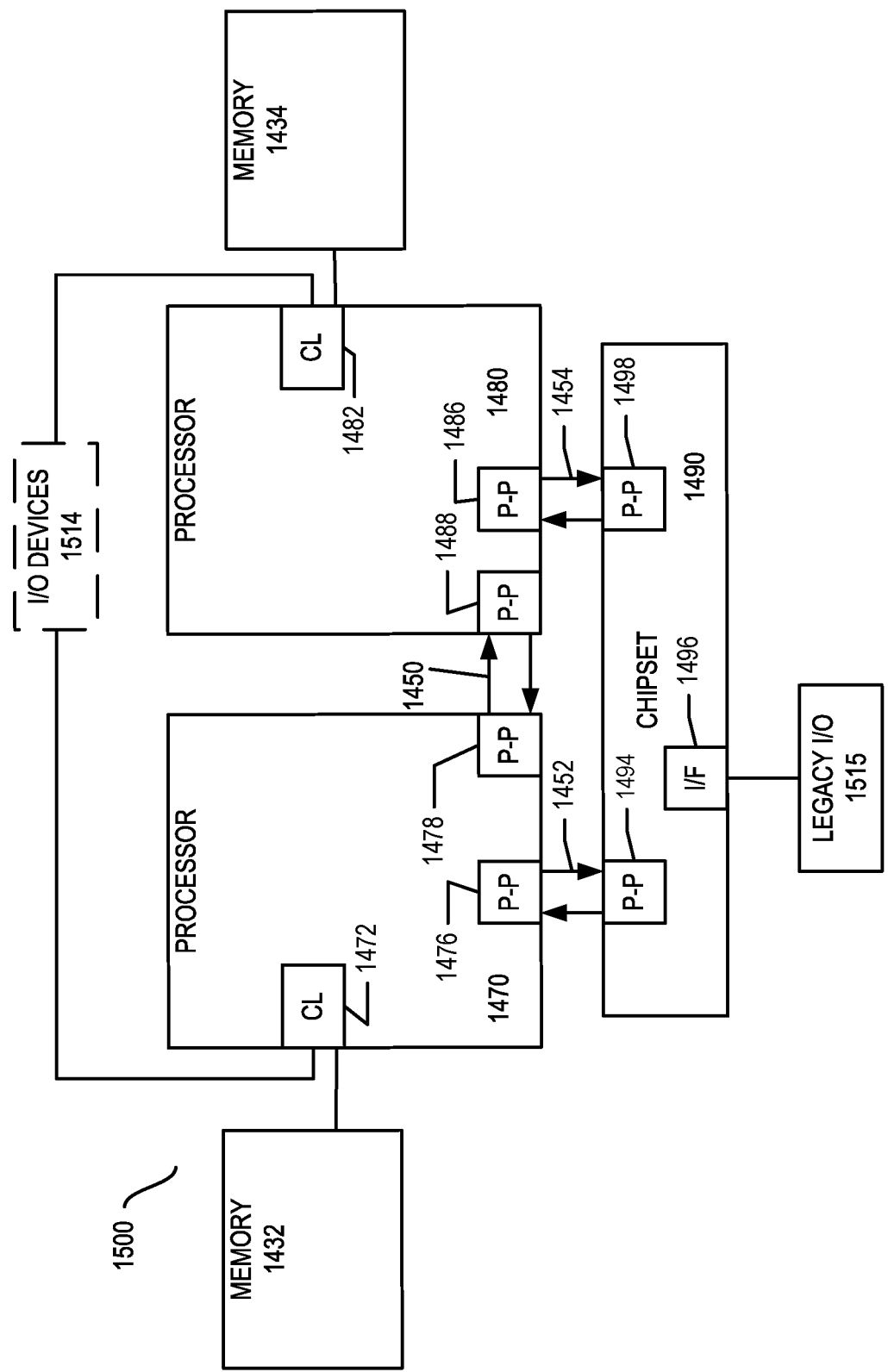

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
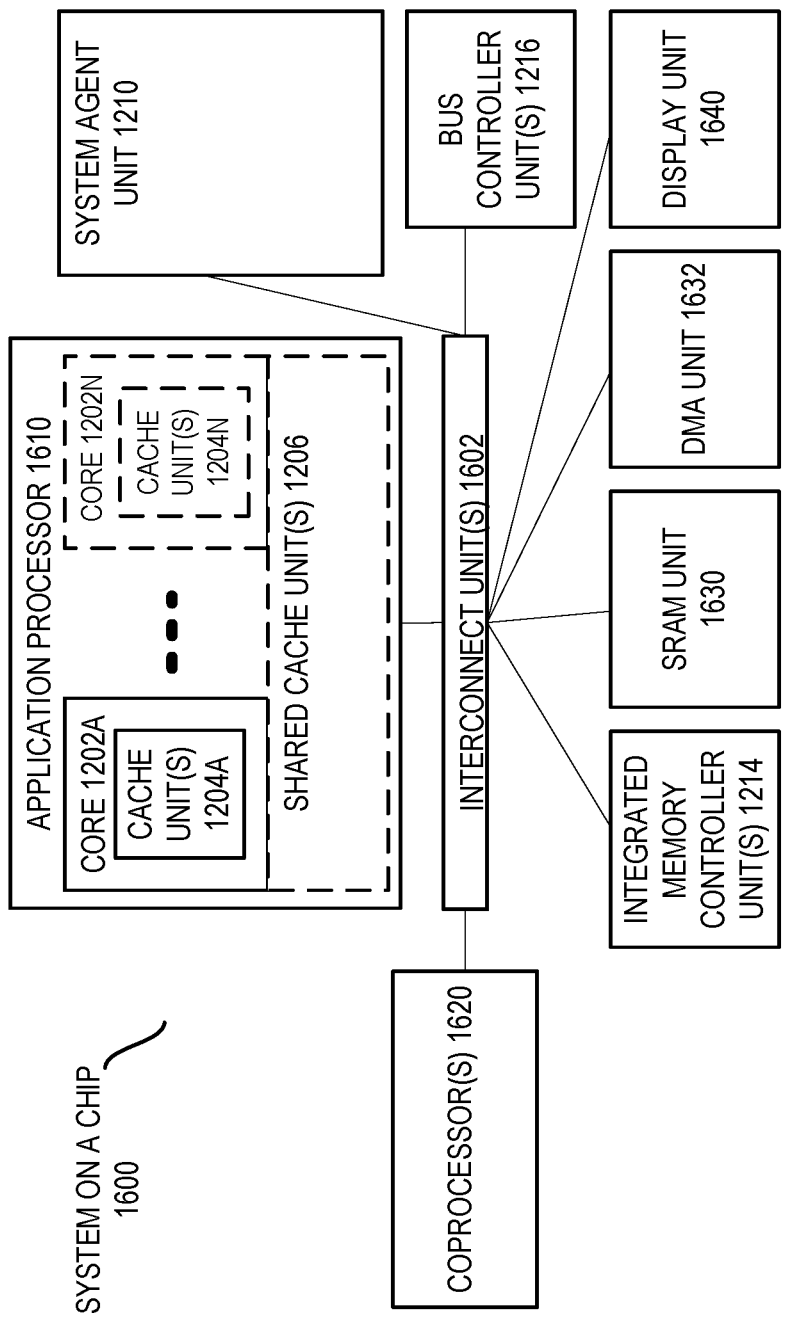

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of implementing a neural network using in-memory, bit-serial, mathematical operations performed by a pipelined SRAM architecture (bit-serial PISA) circuitry disposed in on-chip processor memory circuitry. The on-chip processor memory circuitry may include processor last level cache (LLC) circuitry. The bit-serial PISA circuitry is coupled to PISA memory circuitry via a relatively high-bandwidth connection to beneficially facilitate the storage and retrieval of layer weights by the bit-serial PISA circuitry during execution. Direct memory access (DMA) circuitry transfers the neural network model and input data from system memory to the bit-serial PISA memory and also transfers output data from the PISA memory circuitry to system memory circuitry. Thus, the systems and methods described herein beneficially leverage the on-chip processor memory circuitry to perform a relatively large number of vector/tensor calculations without burdening the processor circuitry.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for implementing a neural network using in-memory, bit-serial, mathematical operations performed by a pipelined SRAM architecture (bit-serial PISA) circuitry disposed in on-chip processor memory circuitry.

According to example 1, there is provided a system. The system may include: processor circuitry; on-chip processor memory circuitry that includes a plurality of static random access memory (SRAM) arrays, each of the SRAM arrays including microcontroller circuitry; neural network control circuitry to: receive an instruction set architecture (ISA) that includes data representative of a multi-layer neural network model and one or more neural network data inputs; form serially connected bit-serial PISA circuitry using at least a portion of the plurality of SRAM arrays, wherein each of the SRAM arrays included in the portion of the plurality of SRAM arrays represents a single layer of the multi-layer neural network model; cause a transfer of the ISA representative of each layer of the multi-layer neural network model to the microcontroller circuitry in a respective one of the portion of the plurality of SRAM arrays; cause a bidirectional transfer of neural network layer weights between the PISA memory circuitry and the portion of the plurality of SRAM arrays included in the serially connected bit-serial PISA circuitry; cause a transfer of the neural network input data from the PISA memory circuitry to the bit-serial PISA circuitry; and cause a transfer of output data from the serially connected bit-serial PISA circuitry to the PISA memory circuitry.

Example 2 may include elements of example 1 and the system may further include: input/output (I/O) interface circuitry to receive, in a high-level language, the data representative of the multi-layer neural network model and the one or more neural network data inputs, wherein the processor circuitry includes compiler circuitry to compile the received data representative of the multi-layer neural network model and the one or more neural network data inputs from the high-level language to the ISA.

Example 3 may include elements of any of examples 1 or 2 where the compiler circuitry may further include: high level compiler circuitry to compile the received data representative of the multi-layer neural network model and the one or more neural network data inputs from the high-level language to an intermediate domain specific language (DSL); and low-level compiler circuitry to compile the received data representative of the multi-layer neural network model and the one or more neural network data inputs from the DSL to the ISA.

Example 4 may include elements of any of examples 1 through 3 where each of the plurality of SRAM arrays comprises a SRAM array having integer compute capability (C-SRAM) using bit-serial, in-memory, processing.

Example 5 may include elements of any of examples 1 through 4 where the on-chip processor memory circuitry may include last level cache (LLC) memory circuitry.

Example 6 may include elements of any of examples 1 through 5 where the system may include a multi-chip module that includes the processor circuitry, the on-chip processor memory circuitry, and the neural network control circuitry.

Example 7 may include elements of any of examples 1 through 6 where the system may include a central processing unit that includes the processor circuitry and the on-chip processor memory circuitry.

According to example 8, there is provided an in-memory neural network processing method. The method may include: receiving, by neural network control circuitry coupled to processor circuitry, an instruction set architecture (ISA) that includes a multi-layer neural network model and neural network input data; serially coupling, by the neural network control circuitry, a plurality of static random access memory (SRAM) arrays included in on-chip processor memory circuitry to provide pipelined SRAM architecture (bit-serial PISA) circuitry, each of the plurality of SRAM arrays representing a single layer of the multi-layer neural network model and including respective microcontroller circuitry; causing, by the neural network control circuitry, a transfer of the ISA representative of each layer of the multi-layer neural network model to the microcontroller circuitry in a respective one of the plurality of SRAM arrays; causing, by the neural network control circuitry, a bidirectional transfer of neural network layer weights between each of the serially connected SRAM arrays forming the bit-serial PISA circuitry and PISA memory circuitry coupled to the bit-serial PISA circuitry via one or more high-bandwidth connections; causing, by the neural network control circuitry, a transfer of the ISA representative of the neural network input data from the PISA memory circuitry to the bit-serial PISA circuitry; and causing, by the neural network control circuitry, the bit-serial PISA circuitry to perform bit-serial, in-memory, neural network processing using the plurality of SRAM arrays; and causing, by the neural network control circuitry, a transfer of neural network output data from the bit-serial PISA circuitry to the PISA memory circuitry.

Example 9 may include elements of example 8 and the method may additionally include: causing, by the neural network control circuitry, a direct memory access (DMA) transfer of the neural network output data from the PISA memory circuitry to system memory circuitry.

Example 10 may include elements of any of examples 8 or 9, and the method may further include: receiving, at input/output interface circuitry coupled to the processor circuitry, the data representative of the multi-layer neural network model and the neural network input values in a high-level language; and compiling, by compiler circuitry disposed at least partially in the processor circuitry, the received data representative of the multi-layer neural network model and the neural network input values from the high-level language to the ISA.

Example 11 may include elements of any of examples 8 through 10 where compiling the received data representative of the multi-layer neural network model and the neural network input values from the high-level language to the ISA may include: compiling, by high-level compiler circuitry disposed at least partially in the processor circuitry, the received data representative of the multi-layer neural network model and the neural network input values from the high-level language to an intermediate domain specific language (DSL); and compiling, by low-level compiler circuitry disposed at least partially in the processor circuitry, the received data representative of the multi-layer neural network model and the neural network input values from the DSL to the ISA.

Example 12 may include elements of any of examples 8 through 11 where serially coupling a plurality of static random access memory (SRAM) arrays included in on-chip processor memory circuitry to provide pipelined SRAM architecture (bit-serial PISA) circuitry further may include: serially coupling, by the neural network control circuitry, a plurality of static random access memory (SRAM) arrays included in last level cache (LLC) circuitry coupled to the processor circuitry to provide the bit-serial PISA circuitry.

According to example 13, there is provided a non-transitory machine-readable storage medium having instructions that, when executed by neural network control circuitry, may cause the neural network control circuitry to: receive, from communicably coupled processor circuitry, an instruction set architecture (ISA) that includes a multi-layer neural network model and neural network input data; serially couple a plurality of static random access memory (SRAM) arrays included in on-chip processor memory circuitry to provide pipelined SRAM architecture (bit-serial PISA) circuitry, each of the plurality of SRAM arrays representing a single layer of the multi-layer neural network model and including respective microcontroller circuitry; cause a transfer of the ISA representative of each layer of the multi-layer neural network model to the microcontroller circuitry in a respective one of the plurality of SRAM arrays; cause a bidirectional transfer of neural network layer weights between each of the serially connected SRAM arrays forming the bit-serial PISA circuitry and PISA memory circuitry coupled to the bit-serial PISA circuitry via one or more high-bandwidth connections; cause a transfer of the ISA representative of the neural network input data from the PISA memory circuitry to the bit-serial PISA circuitry; cause the bit-serial PISA circuitry to perform bit-serial, in-memory, neural network processing using the plurality of SRAM arrays; and cause a transfer of neural network output data from the bit-serial PISA circuitry to the PISA memory circuitry.

Example 14 may include elements of example 13 where the instructions may further cause the neural network control circuitry to: cause direct memory access (DMA) control circuitry to DMA transfer the neural network output data from the PISA memory circuitry to system memory circuitry.

Example 15 may include elements of any of examples 13 or 14 where the instructions that cause the neural network control circuitry to serially couple a plurality of static random access memory (SRAM) arrays included in on-chip processor memory circuitry to provide pipelined SRAM architecture (bit-serial PISA) circuitry may further cause the neural network control circuitry to: serially couple a plurality of static random access memory (SRAM) arrays included in last level cache (LLC) circuitry coupled to the processor circuitry to provide the bit-serial PISA circuitry.

According to example 16, there is provided an in-memory neural network processing system. The system may include: means for receiving an instruction set architecture (ISA) from processor circuitry, the ISA including a multi-layer neural network model and neural network input data; means for serially coupling a plurality of static random access memory (SRAM) arrays included in on-chip processor memory circuitry to provide pipelined SRAM architecture (bit-serial PISA) circuitry, each of the plurality of SRAM arrays representing a single layer of the multi-layer neural network model and including respective microcontroller circuitry; means for causing a transfer of the ISA representative of each layer of the multi-layer neural network model to the microcontroller circuitry in a respective one of the plurality of SRAM arrays; means for causing a bidirectional transfer of neural network layer weights between each of the serially connected SRAM arrays forming the bit-serial PISA circuitry and PISA memory circuitry coupled to the bit-serial PISA circuitry via one or more high-bandwidth connections; means for causing a transfer of the ISA representative of the neural network input data from the PISA memory circuitry to the bit-serial PISA circuitry; means for causing the bit-serial PISA circuitry to perform bit-serial, in-memory, neural network processing using the plurality of SRAM arrays; and means for causing a transfer of neural network output data from the bit-serial PISA circuitry to the PISA memory circuitry.

Example 17 may include elements of example 16, and the system may further include: means for causing a direct memory access (DMA) transfer of the neural network output data from the PISA memory circuitry to system memory circuitry.

Example 18 may include elements of any of examples 16 or 17, and the system may additionally include: means for receiving the data representative of the multi-layer neural network model and the neural network input values in a high-level language; and means for compiling the received data representative of the multi-layer neural network model and the neural network input values from the high-level language to the ISA.

Example 19 may include elements of any of examples 16 through 18 where the means for compiling the received data representative of the multi-layer neural network model and the neural network input values from the high-level language to the ISA may include: means for compiling the received data representative of the multi-layer neural network model and the neural network input values from the high-level language to an intermediate domain specific language (DSL); and means for compiling the received data representative of the multi-layer neural network model and the neural network input values from the DSL to the ISA.

Example 20 may include elements of any of examples 16 through 19 where the means for serially coupling a plurality of static random access memory (SRAM) arrays included in on-chip processor memory circuitry to provide pipelined SRAM architecture (bit-serial PISA) circuitry further may include: means for serially coupling a plurality of static random access memory (SRAM) arrays included in last level cache (LLC) circuitry coupled to the processor circuitry to provide the bit-serial PISA circuitry.

According to example 21, there is provided an electronic device. The electronic device may include: a circuit board; processor circuitry coupled to the circuit board; on-chip processor memory circuitry that includes a plurality of static random access memory (SRAM) arrays, each of the SRAM arrays including microcontroller circuitry; pipelined SRAM architecture (bit-serial PISA) memory circuitry coupled to the on-chip processor memory circuitry via one or more high-bandwidth connections; system memory; direct memory access control circuitry; and neural network control circuitry to: receive an instruction set architecture (ISA) that includes data representative of a multi-layer neural network model and one or more neural network data inputs; form serially connected bit-serial PISA circuitry using at least a portion of the plurality of SRAM arrays, wherein each of the SRAM arrays included in the portion of the plurality of SRAM arrays represents a single layer of the multi-layer neural network model; cause a transfer of the ISA representative of each layer of the multi-layer neural network model to the microcontroller circuitry in a respective one of the portion of the plurality of SRAM arrays; cause a bidirectional transfer of neural network layer weights between the PISA memory circuitry and the portion of the plurality of SRAM arrays included in the serially connected bit-serial PISA circuitry via the high-bandwidth connection; cause a transfer of the neural network input data from the PISA memory circuitry to the bit-serial PISA circuitry; and cause a transfer of output data from the serially connected bit-serial PISA circuitry to the PISA memory circuitry.

Example 22 may include elements of example 21, and the electronic device may include: input/output (I/O) interface circuitry to receive, in a high-level language, the data representative of the multi-layer neural network model and the one or more neural network data inputs, wherein the processor circuitry includes compiler circuitry to compile the received data representative of the multi-layer neural network model and the one or more neural network data inputs from the high-level language to the ISA.

Example 23 may include elements of any of examples 21 or 22 where the compiler circuitry may include: high level compiler circuitry to compile the received data representative of the multi-layer neural network model and the one or more neural network data inputs from the high-level language to an intermediate domain specific language (DSL); and low-level compiler circuitry to compile the received data representative of the multi-layer neural network model and the one or more neural network data inputs from the DSL to the ISA.

Example 24 may include elements of any of examples 21 through 23 where each of the plurality of SRAM arrays may include a SRAM array having integer compute capability (C-SRAM) using bit-serial, in-memory, processing.

Example 25 may include elements of any of examples 21 through 24 where the on-chip processor memory circuitry may include last level cache (LLC) memory.

Example 26 may include elements of any of examples 21 through 25 where the system may include a multi-chip module that includes the processor circuitry, the on-chip processor memory circuitry, and the neural network control circuitry.

Example 27 may include elements of any of examples 21 through 26 where the system may include a central processing unit that includes the processor circuitry and the on-chip processor memory circuitry.

According to example 28, there is provided a system for implementing a neural network using in-memory, bit-serial, mathematical operations performed by a pipelined SRAM architecture (bit-serial PISA) circuitry disposed in on-chip processor memory circuitry, the system being arranged to perform the method of any of examples 8 through 12.

According to example 29, there is provided a chipset arranged to perform the method of any of examples 8 through 12.

According to example 30, there is provided at least one non-transitory machine readable medium comprising a plurality of instructions that, in response to be being executed on a processor-based device, cause the computing device to carry out the method according to any of examples 8 through 12.

According to example 31, there is provided a device configured for implementing a neural network using in-memory, bit-serial, mathematical operations performed by a pipelined SRAM architecture (bit-serial PISA) circuitry disposed in on-chip processor memory circuitry, the device being arranged to perform the method of any of the examples 8 through 12.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system comprising:
   processor circuitry;
   on-chip processor memory circuitry that includes a plurality of static random access memory (SRAM) arrays, each of the SRAM arrays including microcontroller circuitry; and
   neural network control circuitry to:
   receive instructions that include data representative of a multi-layer neural network model and neural network input data;
   form serially coupled, bit-serial, pipelined static random access memory architecture (bit-serial PISA) circuitry using at least a portion of the plurality of SRAM arrays, each of the SRAM arrays included in the portion of the plurality of SRAM arrays to determine a single layer of the multi-layer neural network model;
   cause a transfer of one or more subsets of the instructions, each of the one or more subsets representative of a layer of the multi-layer neural network model, to the microcontroller circuitry in a respective one of the portion of the plurality of SRAM arrays;
   cause, via one or more high-bandwidth connections, a bidirectional transfer of neural network layer weights between PISA memory circuitry and the portion of the plurality of SRAM arrays included in the serially coupled bit-serial PISA circuitry;
   cause a transfer of the neural network input data from the PISA memory circuitry to the serially coupled bit-serial PISA circuitry; and
   cause a transfer of output data from the serially coupled bit-serial PISA circuitry to the PISA memory circuitry.

2. The system of claim 1 wherein each of the plurality of SRAM arrays comprises a SRAM array having integer compute capability (C-SRAM) using bit-serial, in-memory, processing.

3. The system of claim 1 wherein the on-chip processor memory circuitry comprises last level cache (LLC) memory.

4. The system of claim 1 wherein the system comprises a multi-chip module that includes the processor circuitry, the on-chip processor memory circuitry, and the neural network control circuitry.

5. The system of claim 1 wherein the system comprises a central processing unit that includes the processor circuitry and the on-chip processor memory circuitry.

6. A non-transitory machine-readable storage medium having instructions that, when executed by neural network control circuitry, cause the neural network control circuitry to:
  receive, from communicably coupled processor circuitry, an instruction set architecture (ISA) that includes a multi-layer neural network model and neural network input data;
  serially couple a plurality of static random access memory (SRAM) arrays included in on-chip processor memory circuitry to provide bit-serial pipelined SRAM architecture (bit-serial PISA) circuitry, each of the plurality of SRAM arrays to determine a single layer of the multi-layer neural network model and including respective microcontroller circuitry;
  cause a transfer of the ISA representative of each layer of the multi-layer neural network model to the microcontroller circuitry in a respective one of the plurality of SRAM arrays;
  cause a bidirectional transfer of neural network layer weights between each of the serially connected SRAM arrays forming the bit-serial PISA circuitry and PISA memory circuitry coupled to the bit-serial PISA circuitry via one or more high-bandwidth connections;
  cause a transfer of the ISA representative of the neural network input data from the PISA memory circuitry to the bit-serial PISA circuitry;
  cause the bit-serial PISA circuitry to perform bit-serial, in-memory, neural network processing using the plurality of SRAM arrays; and
  cause a transfer of neural network output data from the bit-serial PISA circuitry to the PISA memory circuitry.

7. The non-transitory machine-readable storage medium of claim 6 wherein the instructions further cause the neural network control circuitry to:
  cause direct memory access (DMA) control circuitry to transfer the neural network output data from the PISA memory circuitry to system memory circuitry.

8. The non-transitory machine-readable storage medium of claim 6 wherein the instructions that cause the neural network control circuitry to serially couple a plurality of static random access memory (SRAM) arrays included in on-chip processor memory circuitry to provide pipelined SRAM architecture (bit-serial PISA) circuitry further cause the neural network control circuitry to:
  serially couple a plurality of static random access memory (SRAM) arrays included in last level cache (LLC) circuitry coupled to the processor circuitry to provide the bit-serial PISA circuitry.

9. An in-memory neural network processing system, comprising:
  means for receiving an instruction set architecture (ISA) from processor circuitry, the ISA including a multi-layer neural network model and neural network input data;
  means for serially coupling a plurality of static random access memory (SRAM) arrays included in on-chip processor memory circuitry to provide bit-serial pipelined SRAM architecture (bit-serial PISA) circuitry, each of the plurality of SRAM arrays representing a single layer of the multi-layer neural network model and including respective microcontroller circuitry;
  means for causing a transfer of the ISA representative of each layer of the multi-layer neural network model to the microcontroller circuitry in a respective one of the plurality of SRAM arrays;
  means for causing a bidirectional transfer of neural network layer weights between each of the serially coupled SRAM arrays forming the bit-serial PISA circuitry and PISA memory circuitry coupled to the bit-serial PISA circuitry via one or more high-bandwidth connections;
  means for causing a transfer of the ISA representative of the neural network input data from the PISA memory circuitry to the bit-serial PISA circuitry;
  means for causing the bit-serial PISA circuitry to perform bit-serial, in-memory, neural network processing using the plurality of SRAM arrays; and
  means for causing a transfer of neural network output data from the bit-serial PISA circuitry to the PISA memory circuitry;
  wherein the means for receiving, the means for serially coupling, the means for causing a transfer of the ISA representative, the means for causing a bidirectional transfer, the means for causing the bit-serial PISA circuitry to perform and the means for causing a transfer of neural network output data comprise hardware circuitry.

10. The system of claim 9, further comprising:
  means for causing a direct memory access (DMA) transfer of the neural network output data from the PISA memory circuitry to system memory circuitry.

11. The system of claim 10, further comprising:
  means for receiving the data representative of the multi-layer neural network model and the neural network input values in a high-level language; and
  means for compiling the received data representative of the multi-layer neural network model and the neural network input values from the high-level language to the ISA.

12. The system of claim 11 wherein the means for compiling the received data representative of the multi-layer neural network model and the neural network input values from the high-level language to the ISA comprises:
  means for compiling the received data representative of the multi-layer neural network model and the neural network input values from the high-level language to an intermediate domain specific language (DSL); and
  means for compiling the received data representative of the multi-layer neural network model and the neural network input values from the DSL to the ISA.

13. The system of claim 9 wherein the means for serially coupling a plurality of static random access memory (SRAM) arrays included in on-chip processor memory circuitry to provide pipelined SRAM architecture (bit-serial PISA) circuitry further comprises:
  means for serially coupling a plurality of static random access memory (SRAM) arrays included in last level cache (LLC) circuitry coupled to the processor circuitry to provide the bit-serial PISA circuitry.

14. An electronic device, comprising:
  a circuit board;
  processor circuitry coupled to the circuit board;

on-chip processor memory circuitry that includes a plurality of static random access memory (SRAM) arrays, each of the SRAM arrays including microcontroller circuitry;

system memory circuitry;

direct memory access control circuitry; and neural network control circuitry to:

receive instructions that include data representative of a multi-layer neural network model and neural network input data;

form serially coupled, bit-serial, pipelined static random access memory architecture (bit-serial PISA) circuitry using at least a portion of the plurality of SRAM arrays, each of the SRAM arrays included in the portion of the plurality of SRAM arrays to determine a single layer of the multi-layer neural network model;

cause a transfer of one or more subsets of the instructions, each of the one or more subsets representative of a layer of the multi-layer neural network model, to the microcontroller circuitry in a respective one of the portion of the plurality of SRAM arrays;

cause, via one or more high-bandwidth connections, a bidirectional transfer of neural network layer weights between PISA memory circuitry and the portion of the plurality of SRAM arrays included in the serially coupled bit-serial PISA circuitry;

cause a transfer of the neural network input data from the PISA memory circuitry to the bit-serial PISA circuitry; and cause a transfer of output data from the serially coupled bit-serial PISA circuitry to the PISA memory circuitry.

15. The electronic device of claim 14 wherein each of the plurality of SRAM arrays comprises a SRAM array having integer compute capability (C-SRAM) using bit-serial, in-memory, processing.

16. The electronic device of claim 14 wherein the on-chip processor memory circuitry comprises last level cache (LLC) memory.

17. The electronic device of claim 14 wherein the system comprises a multi-chip module that includes the processor circuitry, the on-chip processor memory circuitry, and the neural network control circuitry.

18. The electronic device of claim 14 wherein the system comprises a central processing unit that includes the processor circuitry and the on-chip processor memory circuitry.

* * * * *